US011755683B2

(12) United States Patent
Gunnam et al.

(10) Patent No.: US 11,755,683 B2
(45) Date of Patent: *Sep. 12, 2023

(54) FLEXIBLE ACCELERATOR FOR SPARSE TENSORS (FAST) IN MACHINE LEARNING

(71) Applicant: Western Digital Technologies, Inc., San Jose, CA (US)

(72) Inventors: Kiran Gunnam, Milpitas, CA (US); Anand Kulkarni, San Jose, CA (US); Zvonimir Bandic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 491 days.

This patent is subject to a terminal disclaimer.

(21) Appl. No.: 16/726,084

(22) Filed: Dec. 23, 2019

(65) Prior Publication Data

US 2021/0191733 A1 Jun. 24, 2021

(51) Int. Cl.
*G06F 17/16* (2006.01)
*G06F 9/38* (2018.01)
(Continued)

(52) U.S. Cl.
CPC ............ *G06F 17/16* (2013.01); *G06F 9/3877* (2013.01); *G06F 9/3891* (2013.01);
(Continued)

(58) Field of Classification Search
CPC .. G06F 9/3891; G06F 9/3877; G06F 9/44578; G06F 9/5094; G06F 9/5044;
(Continued)

(56) References Cited

U.S. PATENT DOCUMENTS 6,760,791 B1 7/2004 Askar
8,832,004 B2 9/2014 Kato et al.
(Continued)

FOREIGN PATENT DOCUMENTS

CN 110163042 A 8/2019
WO WO2019/196222 A1 10/2019

OTHER PUBLICATIONS

Chen, Yu-Hsin, et al., "Eyeriss v2: A Flexible Accelerator for Emerging Deep Neural Networks on Mobile Devices," IEEE Journal on Emerging and Selected Topics in Circuits and Systems, vol. 9, No. 2, Jun. 2019, 17 pages.
(Continued)

*Primary Examiner* — Jorge A Chu Joy-Davila
(74) *Attorney, Agent, or Firm* — Vierra Magen Marcus LLP

(57) ABSTRACT

An apparatus includes a first tensor compute cluster configured to receive first input feature tensors, a second tensor compute cluster configured to receive second input feature tensors more sparse than the first input feature tensors, and a vector accelerator. The apparatus also includes circuitry configured to partition an input feature map into a plurality of input feature tensors based on a compression criteria and assign each of the plurality of input feature tensors to one of the first tensor compute cluster, the second tensor compute cluster, or the vector accelerator based upon at least one of parameters including a sparsity and an optimization parameter.

20 Claims, 20 Drawing Sheets

(51) Int. Cl.
| | |
|---|---|
| *G06F 9/445* | (2018.01) |
| *G06F 9/50* | (2006.01) |
| *G06N 20/00* | (2019.01) |
| *G06F 18/24* | (2023.01) |
| *G06V 10/764* | (2022.01) |
| *G06V 10/82* | (2022.01) |
| *G06V 10/94* | (2022.01) |

(52) U.S. Cl.
CPC ........ *G06F 9/44578* (2013.01); *G06F 9/5094* (2013.01); *G06F 18/24* (2023.01); *G06N 20/00* (2019.01); *G06V 10/764* (2022.01); *G06V 10/82* (2022.01); *G06V 10/94* (2022.01); *G06F 9/5044* (2013.01); *G06F 9/5072* (2013.01)

(58) Field of Classification Search
CPC ..... G06F 9/5072; G06F 17/16; G06K 9/6267; G06K 9/6271; G06N 20/00; G06N 3/0481; G06N 3/0454; G06N 3/063; G06V 10/82; G06V 10/94
See application file for complete search history.

(56) References Cited

U.S. PATENT DOCUMENTS

| | | | |
|---|---|---|---|
| 10,180,928 | B2 | 1/2019 | Nurvitadhi et al. |
| 10,579,591 | B1* | 3/2020 | Diamant ............ G06F 16/1727 |
| 11,462,003 | B2 | 10/2022 | Gunnam et al. |
| 2007/0073538 | A1 | 3/2007 | Rifkin |
| 2007/0143380 | A1 | 6/2007 | Plow et al. |
| 2009/0316677 | A1 | 12/2009 | Kikuchi et al. |
| 2014/0236965 | A1 | 8/2014 | Yarmus |
| 2017/0316312 | A1 | 11/2017 | Goyal et al. |
| 2017/0323196 | A1 | 11/2017 | Gibson et al. |
| 2017/0365306 | A1 | 12/2017 | Ouyang et al. |
| 2018/0046916 | A1 | 2/2018 | Dally et al. |
| 2018/0173677 | A1* | 6/2018 | Muralimanohar ...... G06F 17/16 |
| 2018/0336456 | A1 | 11/2018 | Norrie et al. |
| 2018/0349095 | A1 | 12/2018 | Wu et al. |
| 2019/0042257 | A1 | 2/2019 | Baum et al. |
| 2019/0205358 | A1 | 7/2019 | Diril et al. |
| 2019/0243653 | A1 | 8/2019 | Sodani et al. |
| 2019/0243800 | A1 | 8/2019 | Sodani et al. |
| 2019/0243871 | A1 | 8/2019 | Sodani et al. |
| 2019/0244117 | A1 | 8/2019 | Sodani et al. |
| 2019/0244118 | A1 | 8/2019 | Sodani et al. |
| 2019/0244130 | A1 | 8/2019 | Sodani et al. |
| 2019/0244141 | A1 | 8/2019 | Sodani et al. |
| 2019/0278600 | A1 | 9/2019 | Frumkin et al. |
| 2019/0286974 | A1 | 9/2019 | Li et al. |
| 2019/0377606 | A1 | 12/2019 | Feng et al. |
| 2020/0311183 | A1 | 10/2020 | Simpson |
| 2020/0341772 | A1 | 10/2020 | Chilappagari et al. |
| 2021/0182025 | A1 | 6/2021 | Shafiee et al. |
| 2021/0182077 | A1 | 6/2021 | Chen et al. |
| 2021/0256357 | A1 | 8/2021 | Najafi et al. |
| 2021/0303976 | A1 | 9/2021 | Gunnam et al. |
| 2021/0357741 | A1 | 11/2021 | Jha |
| 2022/0006821 | A1 | 1/2022 | Koyama et al. |

OTHER PUBLICATIONS

Hegde, Kartik, et al., "ExTensor: An Accelerator for Sparse Tensor Algebra," Micro '52: Proceedings of the 52nd Annual IEEE/ACM International Symposium on Micro architecture, Oct. 16, 2019, 15 pages.
International Search Report & The Written Opinion of the International Searching Authority dated Sep. 15, 2020, International Application No. PCT/US2020/024117.
A. Coates et al.,"Deep learning with COTS HPC systems", Proceedings of the 30th International Conference on Machine Learning, Atlanta, Georgia, US, 2013.
A. Krizhevsky et al., "ImageNet Classification with Deep Convolutional Neural Networks", 2012.
A.Parasnar, et al., SCNN: An Accelerator for Compressed-Sparse Convolutional Neural Networks, May 23, 2017.
Albericio, J. et al., "Cnvlutin: Ineffectual-Neuron-Free Deep Neural Network Computing", Conference Paper—Jun. 2016.
Bendersky, Eli "Depthwise separable convolutions for machine learning" (Apr. 4, 2018), Eli Bendersky's website, from https://eli.thegreenplace.net/2018/depthwise-separable-convolutions-for-machine-learning/ (retrieved Mar. 3, 2020).
Chen et al. "Escoin: Efficient Sparse Convolutional Neural Network Inference on GPUs", Apr. 3, 2019.
Chen, Tianshi et al., "DianNao: A Small-Footprint High-Throughput Accelerator for Ubiquitous Machine-Learning", ASPLOS '14, Salt Lake City, Utah, USA, 2014.
Chen, Yunji et al., "DaDianNao: A Machine-Learning Supercomputer", 2014 47th Annual IEE/ACM International Symposium on Microarchitecture, IEEE Computer Society, 2014.
Du, Zidong et al., "Shidiannao Shifting Vision Processing Closer to the Sensor", Portland, Or, USA, ACM, 2015.
Han, Song et al., "EIE: Efficient Inference Engine on Compressed Deep Neural Network", IEEE Press 2016.
Han, Song et al., "Deep Compression: Compressing Deep Neural Networks with Pruning, Trained Quantization and Huffman Coding", pp. 1-14, published as a conference paper at ICLR 2016.
Han, Song et al., "ESE: Efficient Speech Recognition Engine with Sparse LSTM on FPGA", ACM, Feb. 20, 2017.
Han, Song et al., "Learning Both Weights and Connections for Efficient Neural Networks", pp. 1-9, 2015.
J. L. Holt and J.-N. Hwang, 'Finite precision error analysis of neural network hardware implementations,' IEEE Transactions on Computers, vol. 42, 1993.
J. Zhang, K. Fangineni, Z. Ghodsi, S. Garg, "ThUnderVolt: Enabling Aggressive Voltage Underscaling and Timing Error Resilience for Energy Efficient Deep Learning Accelerators" 2018 Association for Computing Machinery (DAC 18). Jun. 2018.
Jouppi, Norman P. et al., "In-Datacenter Performance Analysis of a Tensor Processing Unit", Google, Inc., Mountain View, CA USA, 2017.
Khlestov, Illarion "Different types of the convolution layers" (2019), Illarion's Notes, Github, from https://ikhlestov.github.io/pages/machine-learning/convolutions-types/ (retrieved Mar. 3, 2020).
Kim et al., "Parallax Sparsity aware Data Parallel Training of Deep Neural Networks", Seoul National University, Dec. 25, 2018.
Le, Quoc V., "Building High-level Features Using Large Scale Unsupervised Learning," Proceedings of the 29th International Conference on Machine Learning, Edinburgh, Scotland, UK, 2012.
Lee, Ching-En et al., "Stitch-X—An Accelerator Architecture for Exploiting Unstructured Sparsity in Deep Neural Networks", University of Michigan, NVIDIA, and Massachusetts Institute of Technology.
Lu et al., "Promoting the Harmony between Sparsity and Regularity: A Relaxed Synchronous Architecture for Convolutional Neural Networks", 2018.
Lu et al., "SpWA An Efficient Sparse Winograd Convolutional Neural Networks Accelerator on FPGAs", Center for Energy-efficient Computing and Applications, School of EECS, Peking University, 2018.
NVIDIA Deep Learning Accelerator: NVDLA Open Source Project» Ducumentation»NVDLA, from http://nvdla.org/ (retrieved May 8, 2019).
Page et al. "SPARCNet: A Hardware Accelerator for Efficient Deployment of Sparse Convolutional Networks", University of Maryland, Baltimore County, 2017.
Rastegari, M. et al., XNOR-Net: ImageNet Classification Using Binary Convolutional Neural Networks, Allen Institute for AI, University of Washington, Aug. 2, 2016.
Smith, Steven W. "The Scientist and Engineer's Guide to Digital Signal Processing" Chapter 27, 22 pgs. (Published 2011) from https://www.dspguide.com/ch27/2.htm (Retrieved Nov. 11, 2019).
Sombatsiri et al., "Parallelism-flexible Convolution Core for Sparse Convolutional Neural Networks on FPGA", IPSJ Transactions on System LSI Design Methodology, vol. 12, pp. 22-37, Feb. 2019.

(56) References Cited

OTHER PUBLICATIONS

Steffl, Samuel et al., "LACore: A RISC-V Based Linear Algebra Accelerator for SOC Designs" IEEE Conference on Computer Design, 2007, retrieved from https://content.riscv.org/wp-content/uploads/2017/12/Wed1612 linear algebra Steffl.pdf (Retrieved Nov. 11, 2019) 11 pgs.

Wang, Yi et al., "Exploiting Parallelism for CNN Applications on 3D Stacked Processing-In-Memory Architecture", pp. 1-12, IEEE, 2018.

Yao, Zhuliang et al. "Balanced Sparsity for Efficient DNN Inference on GPU", Association for the Advancement of Artificual Intilligence (www.aaai.org), 2019.

Zhang, Shijin et al.,"Cambricon-X: An Accelerator for Sparse Neural Networks", IEEE, 2016.

Zhou, Xuda, et al. "Cambricon-S: Addressing Irregularity in Sparse Neural Networks through A Cooperative Software/ Hardware Approach", 2018 51st Annual IEEE/ACP International Symposium on Microarchitechture, 2018.

International Search Report & The Written Opinion of the International Searching Authority dated Aug. 27, 2020, International Application No. PCT/US2020/035428.

Gondimala A., et al., Sparten: A sparse tensor accelerator for convolutional neural netwosk, In Proceedings of the 52nd Annual IEEE/ACM International Symposium on Microarchitecture, Oct. 12, 2019, Abstract only.

English Abstract of Chinese Publication No. 110163042 published Aug. 23, 2019.

International Search Report & The Written Opinion of the International Searching Authority dated Sep. 6, 2020, International Application No. PCT/US2020/035435.

English Abstract of PCT Publication No. WO2019/196222 published Oct. 17, 2019.

Non-final Office Action dated Sep. 12, 2022, U.S. Appl. No. 16/830,129, filed Mar. 25, 2020.

Response to Office Action dated Nov. 30, 2022, U.S. Appl. No. 16/830,129, filed Mar. 25, 2020.

Final Office Action dated Apr. 10, 2022, U.S. Appl. No. 16/830,129, filed Mar. 25, 2020.

Non-final Office Action dated Apr. 13, 2022, U.S. Appl. No. 16/830,167, filed Mar. 25, 2020.

Response to Office Action dated Jul. 11, 2022, U.S. Appl. No. 16/830,167, filed Mar. 25, 2020.

Notice of Allowance dated Jul. 26, 2022, U.S. Appl. No. 16/830,167, filed Mar. 25, 2020.

Notice of Allowability dated Sep. 6, 2022, U.S. Appl. No. 16/830,167, filed Mar. 25, 2020.

\* cited by examiner

| | | | | | | | |
|---|---|---|---|---|---|---|---|
| 0 | 0 | 0 | 0 | 0 | 5 | 0 | 30 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 5 | 0 | 5 | 0 | 5 | 0 | 5 |
| 10 | 0 | 10 | 0 | 50 | 0 | 49 | 0 |
| 0 | 0 | 0 | 0 | 0 | 0 | 0 | 0 |
| 20 | 0 | 20 | 10 | 40 | 0 | 0 | 14 |

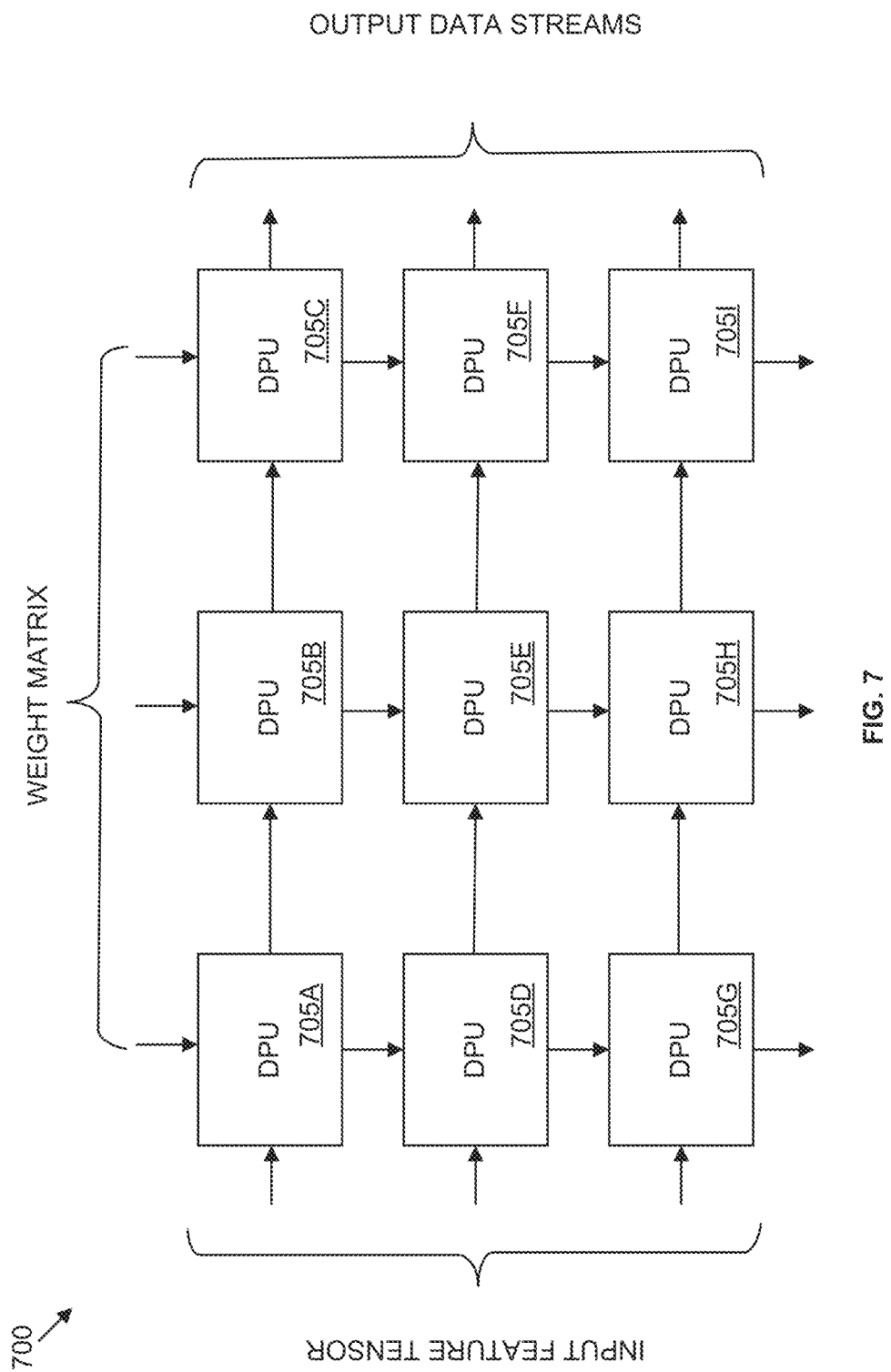

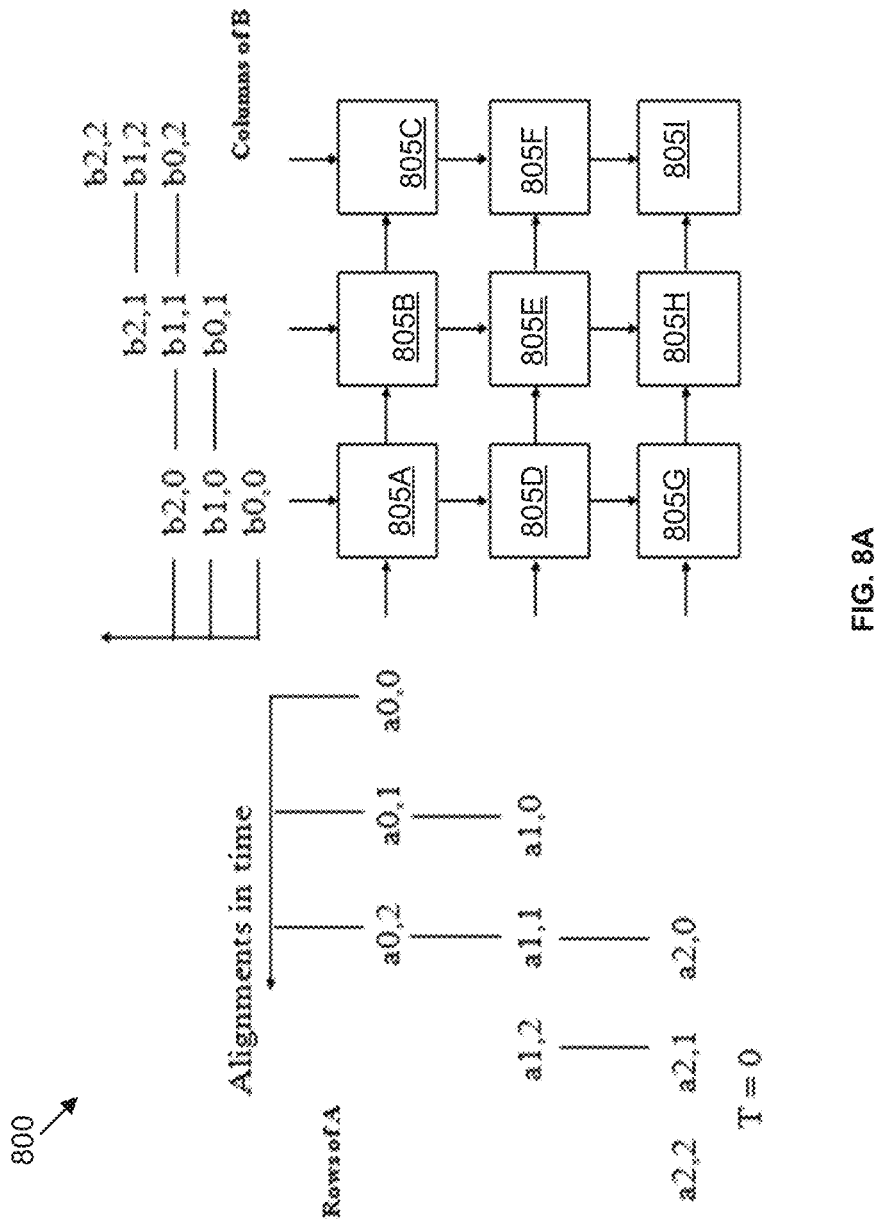

FLEXIBLE ACCELERATOR FOR SPARSE TENSORS (FAST) IN MACHINE LEARNING

BACKGROUND

Applicant provides the following description to assist the understanding of the reader. None of the information provided or references cited is admitted to be prior art.

Machine learning algorithms are used in a wide variety of applications such as medical imaging, computer vision, advertising, gaming, etc. Machine learning algorithms process a large amount of input data. As the amount of input data increases, the computation time and computational resources needed to process the large amount of input data also increases. However, currently used mechanisms are limited in the way they are configured and the way they process input data in machine learning applications.

SUMMARY

In accordance with some aspects of the present disclosure, an apparatus is disclosed. The apparatus includes a first tensor compute cluster configured to receive first input feature tensors, a second tensor compute cluster configured to receive second input feature tensors more sparse than the first input feature tensors, and a vector accelerator. The apparatus also includes circuitry configured to partition an input feature map into a plurality of input feature tensors based on a compression criteria and assign each of the plurality of input feature tensors to one of the first tensor compute cluster, the second tensor compute cluster, or the vector accelerator based upon at least one of parameters including a sparsity and an optimization parameter.

In accordance with some other aspects of the present disclosure, a method is disclosed. The method includes partitioning, by an accelerator, an input feature map into a plurality of portions, each of the plurality of portions having a first cell size, and recursively partitioning, by the accelerator, each of the plurality of portions into a plurality of sub-portions until a compression criteria is reached. Each of the plurality of sub-portions of each of the plurality of portions have a second cell size when the compression criteria is met. The method also includes creating, by the accelerator, an extended subarray based upon the plurality of sub-portions upon meeting the compression criteria. The extended subarray includes a plurality of cells, and each of the plurality of cells corresponds to an input feature tensor. The method further includes assigning, by the accelerator, at least some of the input feature tensors to one of a dense tensor compute cluster, a sparse tensor compute cluster, or a vector accelerator based upon sparsity and an optimization parameter.

In accordance with yet other aspects of the present disclosure, a non-transitory computer-readable media having computer-readable instructions stored thereon is disclosed. The computer-readable instructions when executed by a processor associated with an accelerator cause the optimization processor to partition an input feature map into a plurality of input feature tensors based upon a compression criteria, and assign each of the plurality of input feature tensors to one of a dense tensor compute cluster, a sparse tensor compute cluster, or a vector accelerator based upon sparsity and/or an optimization parameter.

In accordance with some more aspects of the present disclosure, an apparatus is disclosed. The apparatus includes means for partitioning an input feature map into a plurality of input feature tensors based upon a compression criteria and means for assigning each of the plurality of input feature tensors to one of a dense tensor compute cluster, a sparse tensor compute cluster, or a vector accelerator based upon sparsity and/or an optimization parameter.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIGS. 3A-3D show an example of compressing an input feature map by a compression block of the accelerator of FIG. 2, in accordance with some embodiments of the present disclosure.

FIG. 7 is an example block diagram of a systolic array of the dense tensor compute unit of FIG. 6, in accordance with some embodiments of the present disclosure.

FIGS. 8A-8H show an example of a matrix multiplication operation performed by the systolic array of FIG. 7, in accordance with some embodiments of the present disclosure.

Figure 1:
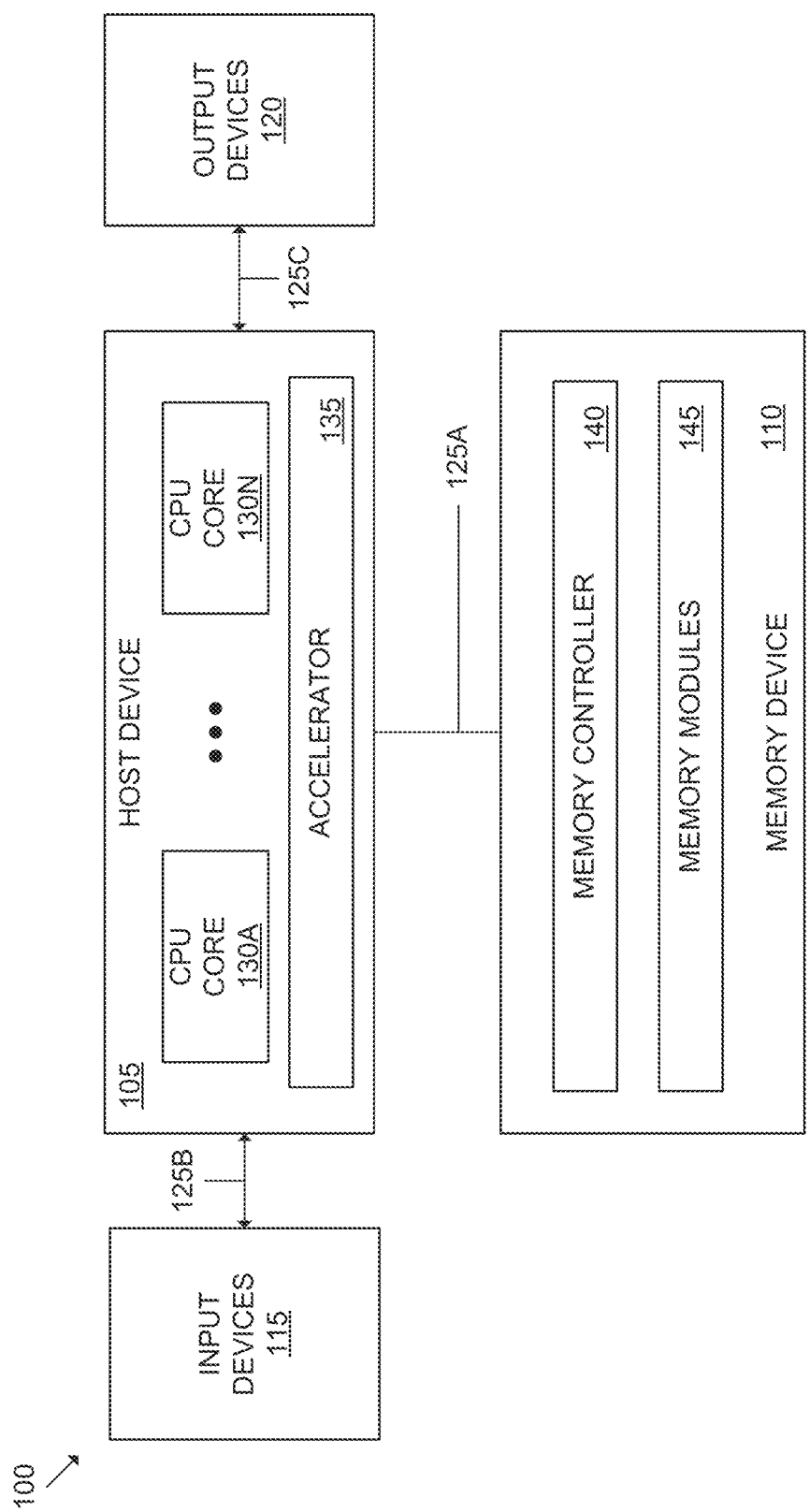
FIG. 1 is an example block diagram of a computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Neural networks keep advancing towards larger and deeper architectures as they get involved in more sophisticated processing tasks in a broader scope of scenarios. Large neural networks intensify the computation and memory accesses with increasing amount of data. Specifically, the number of synapses and neurons in a neural network increase each time the amount of data that needs to be processed increases. For example, some neural networks may have over six hundred thousand neurons, while some other neural networks may have more than one million neurons. The number of synapses may be much larger, for example, over sixty million in one neural network.

Processing such large amount of data brings challenges for off-chip and on-chip memory bandwidth in accelerator architecture design. Mechanisms may be used to either reduce the amount of data on which computation is to be performed or reduce the computation time. One such mechanism that reduces the amount of data to be computed or the computation time may include weight encoding via quantization and entropy coding that further shrink the weight size. Other mechanisms work at the circuit-level, such as using shorter bit-width operators or approximate computing. Another mechanism to reduce computation time or amount of data relies on sparsity. Sparsity may determine the number or percentage of non-zeroes in a given data. Pruning synapses and neurons in a neural network based on sparsity may reduce the amount of data that needs to be computed by more than ten times with negligible accuracy loss. Sparsity may be either static or dynamic. Static sparsity is known beforehand and may not change from one set of input data to another set of input data. The sparsity in weights may be considered static sparsity. For example, the weights that are zero or non-zero in value may be known before the computation on the data is begun. Further, the weights that are zero or non-zero may remain the same from one set of input data to the next. Dynamic sparsity is the sparsity in a feature map of the input data.

Specifically, from an input data (e.g., an input image), one more feature maps may be generated. Each of the feature maps may be combined with associated weights to perform a classification process. Each feature map may have either zero values or non-zero values. The number or percentage of non-zero values in a given feature map may determine the sparsity of the feature map. Since each feature map may be different from another feature map, and the location of the zero and non-zero values may change from feature map to another, the sparsity in a feature map is dynamic sparsity. Since static sparsity is easier to identify and consider in a machine learning operation, many mechanisms that reduce the amount of data to be computed rely on static sparsity only. The irregularity caused by dynamic sparsity prevents many mechanisms from fully leveraging the computation and data reduction.

Thus, the present disclosure provides mechanisms to consider both static sparsity and dynamic sparsity in reducing both the amount of data that is to be computed, as well as reducing the computation time. Specifically, the present disclosure provides a flexible accelerator that identifies both static and dynamic sparsity and allocates computation to specific compute engines that are configured to optimize those computations.

Referring now to FIG. 1, an example block diagram of a computing system 100 is shown, in accordance with some embodiments of the disclosure. The computing system 100 may include a host device 105 associated with a memory device 110. The host device 105 may be configured to receive input from one or more input devices 115 and provide output to one or more output devices 120. The host device 105 may be configured to communicate with the memory device 110, the input devices 115, and the output devices 120 via appropriate interfaces 125A, 125B, and 125C, respectively. The computing system 100 may be implemented in a variety of computing devices such as computers (e.g., desktop, laptop, servers, data centers, etc.), tablets, personal digital assistants, mobile devices, wearable computing devices such as smart watches, other handheld or portable devices, or any other computing unit suitable for performing operations using the host device 105.

The input devices 115 may include any of a variety of input technologies such as a keyboard, stylus, touch screen, mouse, track ball, keypad, microphone, voice recognition, motion recognition, remote controllers, input ports, one or more buttons, dials, joysticks, and any other input peripheral that is associated with the host device 105 and that allows an external source, such as a user, to enter information (e.g., data) into the host device and send instructions to the host device. Similarly, the output devices 120 may include a variety of output technologies such as external memories, printers, speakers, displays, microphones, light emitting diodes, headphones, plotters, speech generating devices, video devices, global positioning systems, and any other output peripherals that are configured to receive information (e.g., data) from the host device 105. The "data" that is either input into the host device 105 and/or output from the host device may include any of a variety of textual data, graphical data, video data, sound data, position data, combinations thereof, or other types of analog and/or digital data that is suitable for processing using the computing system 100.

The host device 105 may include one or more Central Processing Unit ("CPU") cores or processors 130A-130N that may be configured to execute instructions for running one or more applications associated with the host device. The CPU cores 130A-130N are shown as a non-limiting representative example of integrated circuits that can perform processing functions, and may be substituted and/or combined with Field Programmable Gate Array ("FPGA"), Graphical Processing Unit ("GPU"), custom Application Specific Integrated Circuit ("ASIC"), and the like. In some embodiments, the instructions and data needed to run the one or more applications may be stored within the memory device 110. The host device 105 may also be configured to store the results of running the one or more applications within the memory device 110. The host device 105 may also include an accelerator 135. The accelerator 135 may be used to perform machine learning operations. The accelerator 135 is discussed in greater detail in FIG. 2. In some embodiments, the accelerator 135 may be separate from the host device 105 and operatively associated with the host device and/or the memory device 110. Although the accelerator 135 is shown as part of the host device 105 in FIG. 1, in other embodiments it may be apart from the host device and communicatively coupled (e.g., through a bus or network connection) to the host device. In such a case, the accelerator 135 may also be communicatively coupled to the memory device 110, or include its own separate memory device.

To facilitate communication with the memory device 110, the memory device may include or be associated with a memory controller 140. Although the memory controller 140 is shown as being part of the memory device 110, in some embodiments, the memory controller may instead be part of the host device 105 or another element of the computing system 100 and operatively associated with the memory device. The memory controller 140 may be configured as a logical block or circuitry that receives instructions from the host device 105 (e.g., the accelerator 135) and performs operations in accordance with those instructions. The memory device 110 may include one or more memory modules 145 that store data and instructions. The memory modules 145 may be any of a variety of memory types, including a variety of volatile memories, non-volatile memories, or a combination thereof. For example, in some embodiments, one or more of the memory modules 145 or portions thereof may include NAND flash memory cores. In other embodiments, one or more of the memory modules 145 or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the memory device 110. In some embodiments, one or more of the memory modules 145 or portions thereof may be configured as other types of storage class memory ("SCM"). Generally speaking, the memory modules 145 may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

It is to be understood that only some components of the computing system 100 are shown and described in FIG. 1. However, the computing system 100 may include other components such as various batteries and power sources, networking interfaces, routers, switches, external memory systems, controllers, etc. Generally speaking, the computing system 100 may include any of a variety of hardware, software, and/or firmware components that are needed or considered desirable in performing the functions described herein. Similarly, the host device 105, the input devices 115, the output devices 120, and the memory device 110 including the accelerator 135, the memory controller 140, and the memory modules 145 may include other hardware, software, and/or firmware components that are considered necessary or desirable in performing the functions described herein. In addition, in certain embodiments, the memory device 110 may integrate some or all of the components of the host device, including, for example, the CPU cores 130A-130N and/or the accelerator 135.

Figure 2:
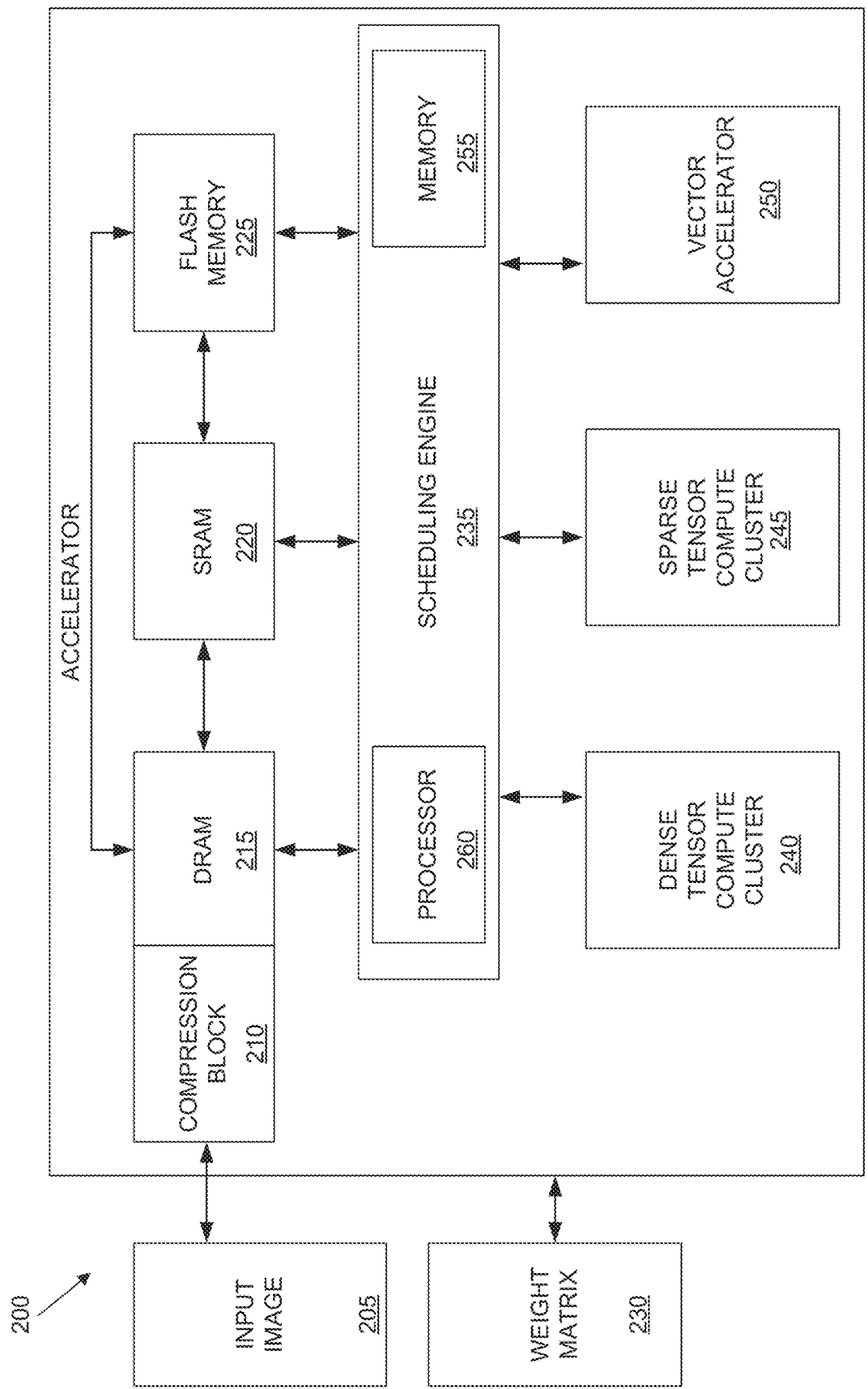
FIG. 2 is an example block diagram of an accelerator of the computing system of FIG. 1, in accordance with some embodiments of the present disclosure.

Turning now to FIG. 2, an example accelerator 200 is shown, in accordance with some embodiments of the present disclosure. The accelerator 200 is analogous to the accelerator 135 of FIG. 1. Thus, although not shown, the accelerator 200 may be associated with a host device (e.g., the host device 105) and a memory device (e.g., the memory device 110). The accelerator 200 may be used to optimize machine learning operations. Specifically, the accelerator 200 may be used to consider dynamic and static sparsity in the feature maps and the weights, respectively, and allocate computation amongst various compute engines based on the dynamic and static sparsity. The accelerator 200 may receive an input image 205 on which one or more machine learning operations are to be performed. It is to be understood that although the input image 205 is used herein as an example, the accelerator 200 may be used to process other types of data including video, text, and any other type of data that may benefit from being processed by the accelerator.

The input image 205 may be represented by an array of pixels. Simply as an example and without intending to be limited in any way, say the input image 205 is represented by a 1024×1024×3 array of pixels such that the input image is 1024 pixels high, 1024 pixels wide, and 3 colors (e.g., Red, Green, Blue) deep. In some embodiments, the 1024× 1024×3 array of pixels may be divided into three feature maps, with each feature map representing one color and being of size 1024×1024×1. In some embodiments, the feature maps of the input image 205 may be generated by the accelerator 200. For example, in some embodiments, a compression block 210 may be configured to generate the feature maps from the input image 205. In other embodiments, a feature map block (not shown) of the accelerator 200 may receive the input image 205, and generate the feature maps therefrom, and send those feature maps to the compression block 210. In yet other embodiments, the feature maps of the input image 205 may be generated outside of the accelerator 200, and instead of the input image, the feature maps may be input into the accelerator.

Each of the feature maps of the input image 205 may undergo a compression process within the compression block 210. The compression process may be configured to divide each feature map into a plurality of portions to take advantage of sparsity. For example, the compression process may identify portions of the feature map having zero and non-zero values. Zero values may be indicative of information (e.g., background of an image) that may not be needed for classification, and therefore, does not need to be processed. Non-zero values may be indicative of classifiable information that may need to be processed. Thus, the compression process divides a feature map into portions of a particular cell-size having either all zero values or at least one non-zero value. The portions having all zero values need not be processed, thereby reducing usage of computational resources and increasing speed of computation. The compression process is discussed in greater detail in FIGS. 3A-4 below. Although not shown, the compression block 210 may include or be associated with a processing unit to perform the compression process. The compression block 210 may also include various logical blocks implemented in software, hardware, firmware, or a combination thereof to perform the compression process.

The compression block 210 may be associated with a DRAM 215 that may be configured to initially store the feature maps of the input image 205, and upon completion of the compression process, store input feature tensors generated from the feature maps. In some embodiments, the DRAM 215 may transfer the input feature tensors to an SRAM 220, which may send the input feature tensors to the compute engines for processing. The accelerator 200 may also include a flash memory 225 that may be configured to store various training models, schedules, and other information needed to process the input feature tensors. The DRAM 215, the SRAM 220, and the flash memory 225 may be interconnected with each other and configured to communicate with each other. In some embodiments, the DRAM 215, the SRAM 220, and the flash memory 225 may all be part of the memory device (e.g., the memory device 110) associated with the host device (e.g., the host device 105) of which the accelerator 200 is part of. In some embodiments, one or more of the DRAM 215, the SRAM 220, or the flash memory 225 may be separate from the memory device (e.g., the memory device 110). Further, although specific types of memory (e.g., the DRAM 215, the SRAM 220, and the flash memory 225) have been used herein, in other embodiments, other or additional types of memories may be used. Additionally, although the DRAM 215, the SRAM 220, and the flash memory 225 have been described herein as storing certain types of data, in other embodiments, other memories may be used to store that data.

In addition to the input image 205, the accelerator 200 may also receive a weight matrix 230. The weight matrix 230 may include weights that are to be applied to the input feature tensors. In some embodiments, the weight matrix 230 may also be compressed to obtain input weight tensors. In some embodiments, the weight matrix 230 may be compressed outside of the accelerator 200 and the input weight tensors may be input into the accelerator. In other embodiments, the compression block 210 may be used to compress the weight matrix 230 in a similar manner to the feature maps of the input image 205. The weight matrix 230 or the input weight tensors may be temporarily stored within the DRAM 215 before being transferred to the SRAM 220. In some embodiments, the weight matrix 230 or the input weight tensors may be stored within the flash memory 225.

The accelerator 200 also includes a scheduling engine 235 that is configured to perform a sparsity analysis, and assign, in some embodiments, each of the input feature tensors to one of a dense tensor compute cluster 240, a sparse tensor compute cluster 245, and a vector accelerator 250 based upon the sparsity analysis. As used herein, "sparsity" means the number or percentage of non-zeroes in a given input data. Thus, to perform the sparsity analysis, the scheduling engine 235 may determine the number or percentage of zeroes or non-zeroes in an input feature tensor, and allocate that input feature tensor to one of the dense tensor compute cluster 240, the sparse tensor compute cluster 245, or the vector accelerator 250. Since the scheduling engine 235 performs the sparsity analysis on the input feature tensors, and the sparsity of one input feature tensor may vary from the sparsity of another input feature tensor, the sparsity analysis performed by the scheduling engine is a dynamic sparsity analysis. In some embodiments, an input feature tensor that has more non-zeroes than zeroes is a less sparse tensor or a dense tensor, whereas, an input feature tensor that has more zeroes than non-zeroes is a sparse tensor. In other embodiments, a sparse tensor may be defined as having at least a certain percentage of zeros (e.g., 80%), and a dense tensor may have more zeroes than non-zeroes (e.g., 60:40). More generally, a sparse tensor has more zeros than a dense tensor.

The scheduling engine 235 may include a memory 255 to store instructions for executing the scheduling engine 235. The memory 255 may be part of the memory device (e.g., the memory device 110) of the host device (e.g., the host device 105) of which the accelerator 200 is part of, or may be provisioned from a separate memory. The instructions of the scheduling engine 235 stored in the memory 255 may be executed by a processor 260. Further, although not shown, the scheduling engine 235 may be implemented as software, hardware, firmware, or combination thereof.

The dense tensor compute cluster 240, the sparse tensor compute cluster 245, and the vector accelerator 250 may be specifically configured to perform operations based on sparsity. For example, the dense tensor compute cluster 240 may be configured to process input feature tensors having lower sparsity (e.g., number or percentage of zeroes below a threshold, or in other words, more non-zero values than zero values). In contrast, the sparse tensor compute cluster 245 may be configured to process input feature tensors having higher sparsity (e.g., number or percentage of zeroes above a threshold, or in other words, more zero values than non-zero values). The vector accelerator 250 may be used to process input feature tensors that cannot be processed by either the dense tensor compute cluster 240 or the sparse tensor compute cluster 245. For example, in some embodiments, the dense tensor compute cluster 240 and the sparse tensor compute cluster 245 may be configured with a defined or supported list of operations that the dense tensor compute cluster and the sparse tensor compute cluster, respectively, may be able to perform. If the processing requires performing an operation that is not supported by either of the dense tensor compute cluster 240 or the sparse tensor compute cluster 245, then that operation may be performed by the vector accelerator 250. In some embodiments, the vector accelerator 250 may be an open source vector accelerator based on RISC-V such as LACore. In other embodiments, other types of suitable vector accelerators may be used for the vector accelerator 250. The dense tensor compute cluster 240 and the sparse tensor compute cluster 245 are described in greater detail below.

Thus, the accelerator 200 is configured to compress feature maps and possibly compress the weight matrix 230 to obtain input feature tensors and input weight tensors, respectively. In one embodiment, the scheduling engine 235 of the accelerator 200 then performs a sparsity analysis on each of the input feature tensors, and allocates each of the input feature tensors (and the corresponding input weight tensor) to one of the dense tensor compute cluster 240, the sparse tensor compute cluster 245, or the vector accelerator 250 for processing based upon the sparsity analysis.

It is to be understood that only some components of the accelerator 200 are shown in FIG. 2. The accelerator 200 may include other or additional components that may be needed or considered desirable in performing the operations described herein.

Referring to FIGS. 3A-3D, an example showing compression of an example feature map 300 is shown, in accordance with some embodiments of the present disclosure. It is to be understood that the feature map 300 is only an example, and is not intended to be limiting in any way. The size of the feature map 300, as well as the pixel values within the feature map are only examples and may vary in other embodiments. The feature map 300 may be obtained from an input data (e.g., the input image 205). To compress the feature map 300, the compression block 210 may apply a hierarchical compression process in which groups of values within the feature map are combined into a tree-like structure. A value of zero at the top level (e.g., the root node) of the tree indicates that all lower level nodes also have zero values. Memory need not be allocated for zero values, resulting in significant decrease in memory consumption. The zero values also need not undergo processing (e.g., the matrix multiplication operation) and may be encoded with a single value of zero at the top level. A value of one at the top level (e.g., the root node) indicates that at least one of the lower levels has a non-zero value, and needs to be allocated memory and undergo processing. The number of levels in the tree and a cell size in each level is configurable and may vary from one embodiment to another. Each level is referred to herein as a compression level.

Figure 3B:
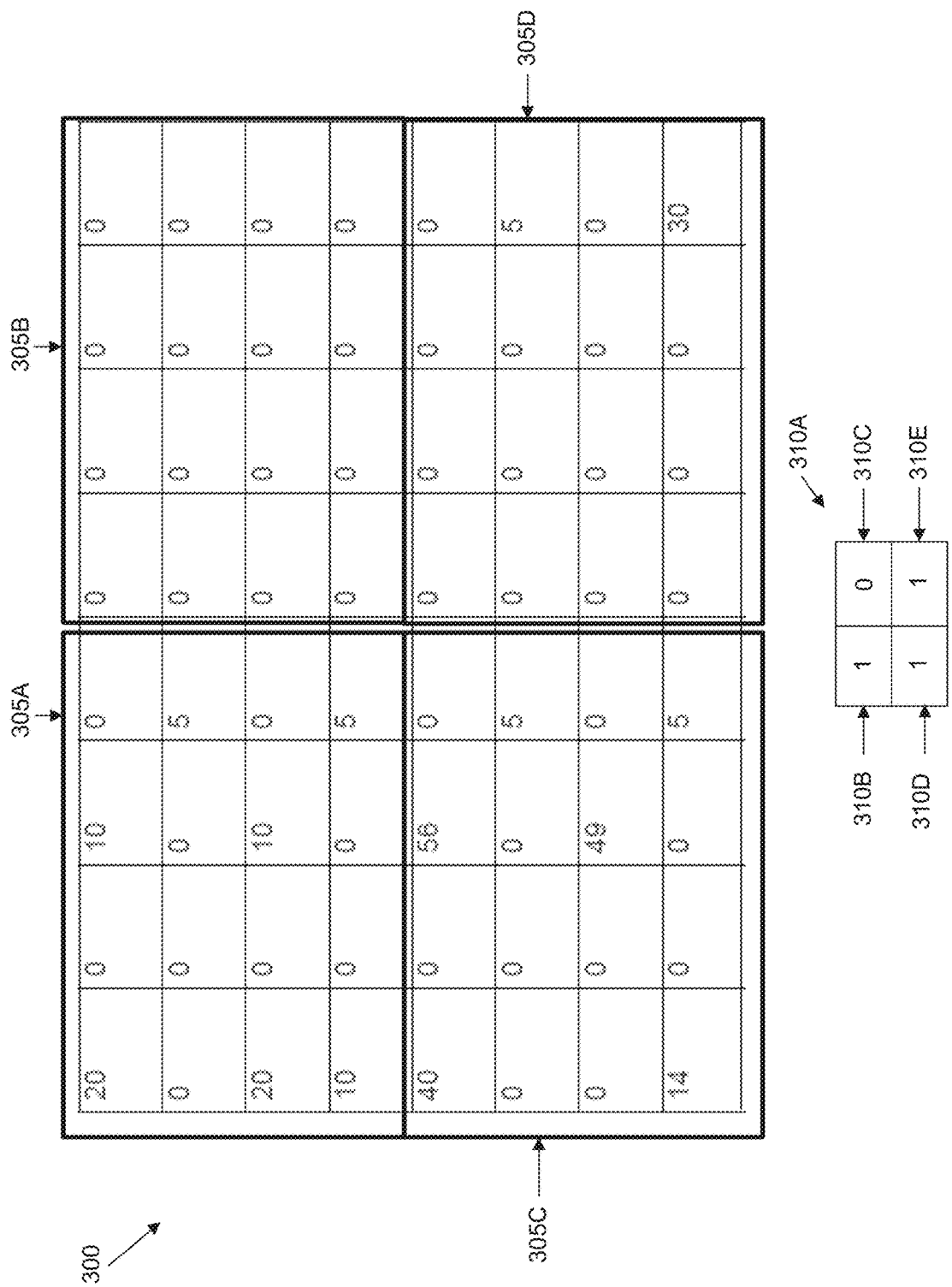
Figure 3C:
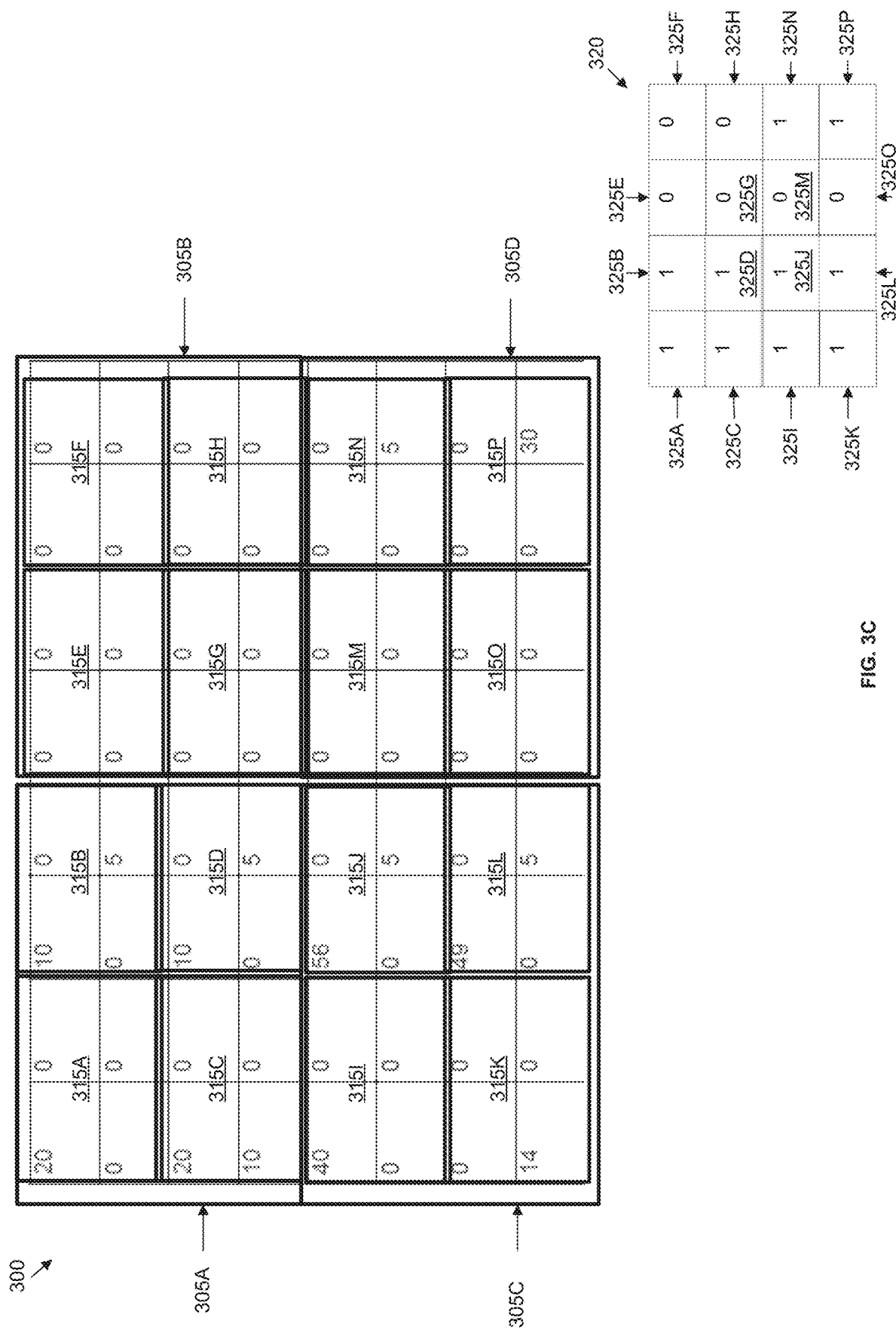

Thus, at the top level or first compression level, the feature map 300 may be divided into a cell size of, say 4×4. Thus, since the feature map 300 includes eight rows and eight columns, a cell size of 4×4 divides the feature map into four portions 305A, 305B, 305C, and 305D, as shown in FIG. 3B. Each of the portions 305A-305D, thus, has a cell size of 4×4. A resulting compressed data structure for the four portions 305A-305D may be a 2×2 logical array 310A. In the logical array 310A, top left cell 310B corresponds to the portion 305A, top right cell 310C corresponds to the portion 305B, bottom left cell 310D corresponds to the portion 305C, and bottom right cell 310E corresponds to the portion 305D. The top left cell 310B is one because the portion 305A includes at least one non-zero value. Similarly, the bottom left cell 310D is one because the portion 305C includes at least one non-zero value, while the bottom right cell 310E is one because the portion 305D also includes at least one non-zero value. However, the top right cell 310C is zero because all of the values in the portion 305B are zeroes. Because the portion 305B has all zero values, those zero values need not be stored and need not be processed. These zero values in the portion 305B may simply be encoded with one single value of zero. Thus, by dividing the feature map 300 into the portions 305A-305D, and identifying portions with all zero values, the computational resources (e.g., memory and processing power) needed may be reduced.

In some embodiments, the feature map 300 may again be compressed at a second compression level. At the second compression level, a cell size that is smaller than the cell size of the first compression level may be selected. For example, in some embodiments, a cell size of 2×2 may be set for the feature map 300. With a cell size of 2×2, each of the portions 305A-305D may be further divided into cell sizes of 2×2. Since each of the portions 305A-305D is a 4×4 cell, dividing the 4×4 cell results in four 2×2 sub-portions in each portion. For example, the portion 305A may be divided into four sub-portions 315A-315D, with each sub-portion having a cell size of 2×2 (e.g., two rows and two columns). Similarly, the portion 305B may be divided into four 2×2 sub-portions 315E-315H, the portion 305C may be divided into four sub-portions 315I-315L, and the portion 305D may be divided into four sub-portions 315M-315P.

Further, from each of the sub-portions 315A-315P, an 4×4 logical array 320 may be generated. Each cell of the logical array 320 corresponds to one of the sub-portions 315A-315P. For example, cell 325A of the logical array 320 corresponds to the sub-portion 315A. Further, the cell 325A has a value of one because the sub-portion 315A has at least one non-zero value. Similarly, cell 325B of the logical array 320 corresponds to the sub-portion 315B, and cells 325C-325P correspond to the sub-portions 315C-315P, respectively. Further, the cells 325B-325D, 325I-325L, 325N, and 325P have a value of one because the corresponding sub-portions 315B-315D, 315I-315L, 315N, and 315P, respectively, have at least one non-zero value. The cells 325E-325H, 325M, and 325O have a value of zero since the corresponding sub-portions 315E-315H, 315M, and 315O, respectively, have all zero values. The cells 325E-325H correspond to the top right value 310C in FIG. 3B, which were already identified as having all zero values, and therefore, not needing to be stored or processed. However, by further compressing the feature map 300 into the sub-portions 315A-315P, the sub-portions 315M and 315O may be further identified as having all zero values, and therefore, not needing to be stored or processed.

Thus, only the sub-portions 315A-315D, 315I-315L, 315N, and 315P, which have non-zero values need to be stored and processed. By recursively dividing the feature map 300 into increasing smaller cell-sizes in each subsequent compression level, and by identifying whether the cells encompassing those cell-sizes have all zero values or at least one non-zero value, portions of the feature map (e.g., portions having all zero values) may be ignored for computational purposes, and those portions that have non-zero values may be processed. Thus, instead of processing the feature map 300 in its entirety, only parts of the feature map may be stored and processed.

Figure 3D:
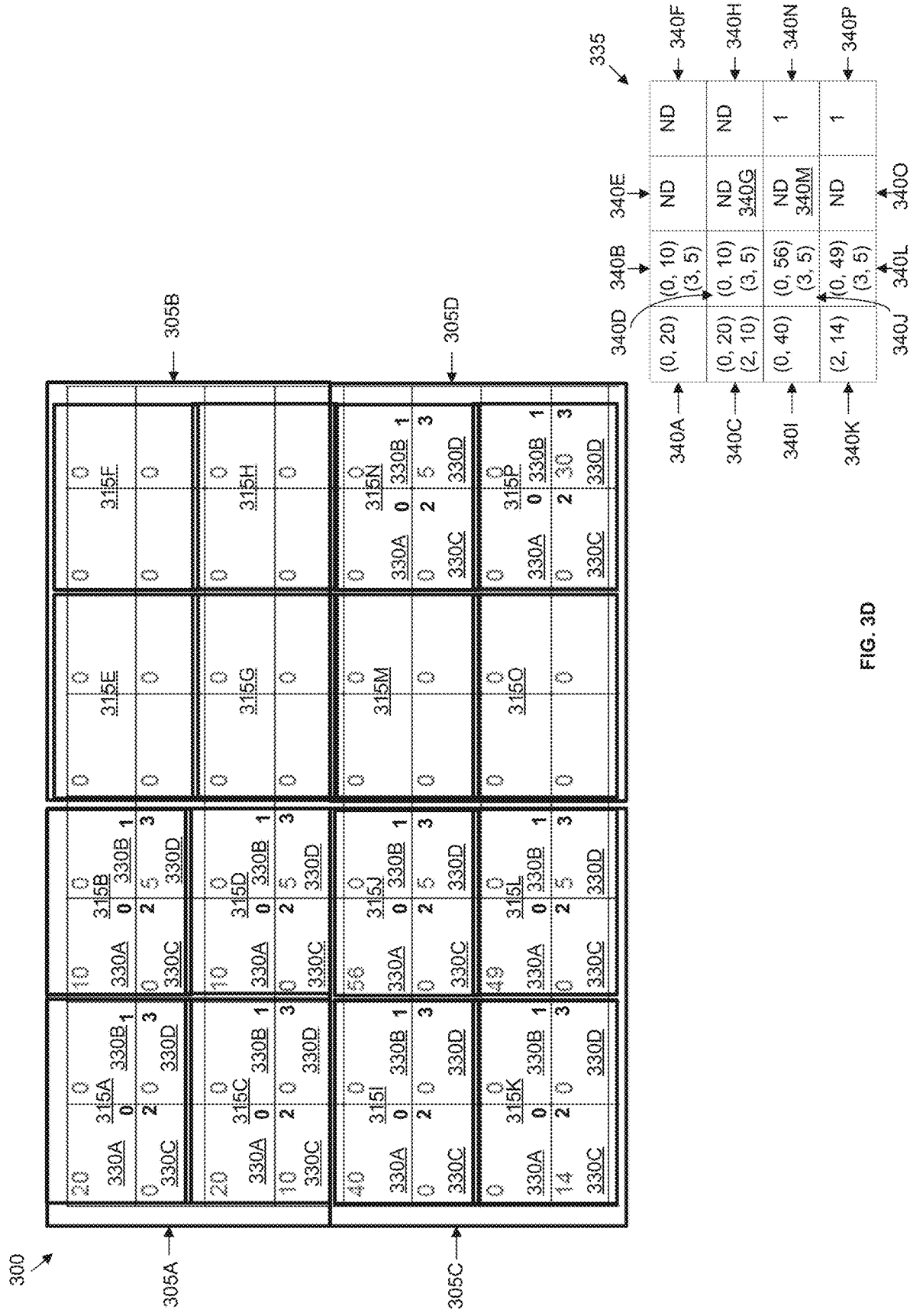

In some embodiments, the 2×2 cell size may be further divided into a smaller cell size of 1×1, and the feature map 300 may be further compressed. For ease of explanation, the 2×2 cell size is assumed to be the lowest cell size for the feature map 300. The remaining sub-portions that have at least one non-zero value may then be encoded using an index and the value of each cell. For example, as shown in FIG. 3D, each cell of each of the sub-portions 315A-315P may be assigned an index value. For example, in some embodiments, a top left cell 330A of a particular one of the sub-portions 315A-315P may be assigned an index value of zero, a top right cell 330B of a particular one of the sub-portions may be assigned an index value of one, a bottom left cell 330C may be assigned an index value of two, and a bottom right cell 330D may be assigned an index value of three. In other embodiments, indices other than zero-three may be used.

Based on the indices and the value in a particular cell, an extended subarray 335 may be created. Each cell of the extended subarray 335 corresponds to a particular one of the sub-portions 315A-315P, and identifies which cells of the corresponding sub-portion have non-zero values. For example, cell 340A of the extended subarray 335 corresponds to the sub-portion 315A and identifies which cells of that sub-portion have non-zero values. Thus, since the sub-portion 315A has a non-zero value (e.g., twenty) in only the top left cell 330A and the top left cell is represented by index zero, the non-zero value in the top left cell is represented by (0, 20) in the cell 340A where 0 is the index of the top left cell and 20 is the value in the top left cell 330A. Similarly, cell 340B corresponds to the sub-portion 315B and identifies the cells in that sub-portion that have non-zero values. Since the top left cell 330A of the sub-portion 315B having index zero has a non-zero value (e.g., ten), that value may be represented in the cell 340B as (0, 10). The bottom right cell 330D of the sub-portion 315B having index three also has a non-zero value (e.g., five), which may be represented in the cell 340B as (3, 5). In a similar way, each cell 340C, 340D, 340I-340L, 340N, and 340P of the extended subarray 335 identifies the non-zero values in the corresponding sub-portions 315C, 315D, 315I-315L, 315N, and 315P, respectively, with their associated index values. The extended subarray 335 may then be stored in a memory (e.g., the DRAM 215) of the accelerator 200 and further processed. Each cell of the extended subarray 335 is referred to as an feature tensor. Thus, from the feature map 300, a plurality of input feature tensors are generated.

It is to be understood that the number of compression levels and the cell sizes in each compression level described in FIGS. 3A-3D are only an example, and may vary in other embodiments based upon the size of the input feature map.

The number of compression levels and the cell sizes in each compression level are configurable, and may vary from one feature map to another.

Figure 4:
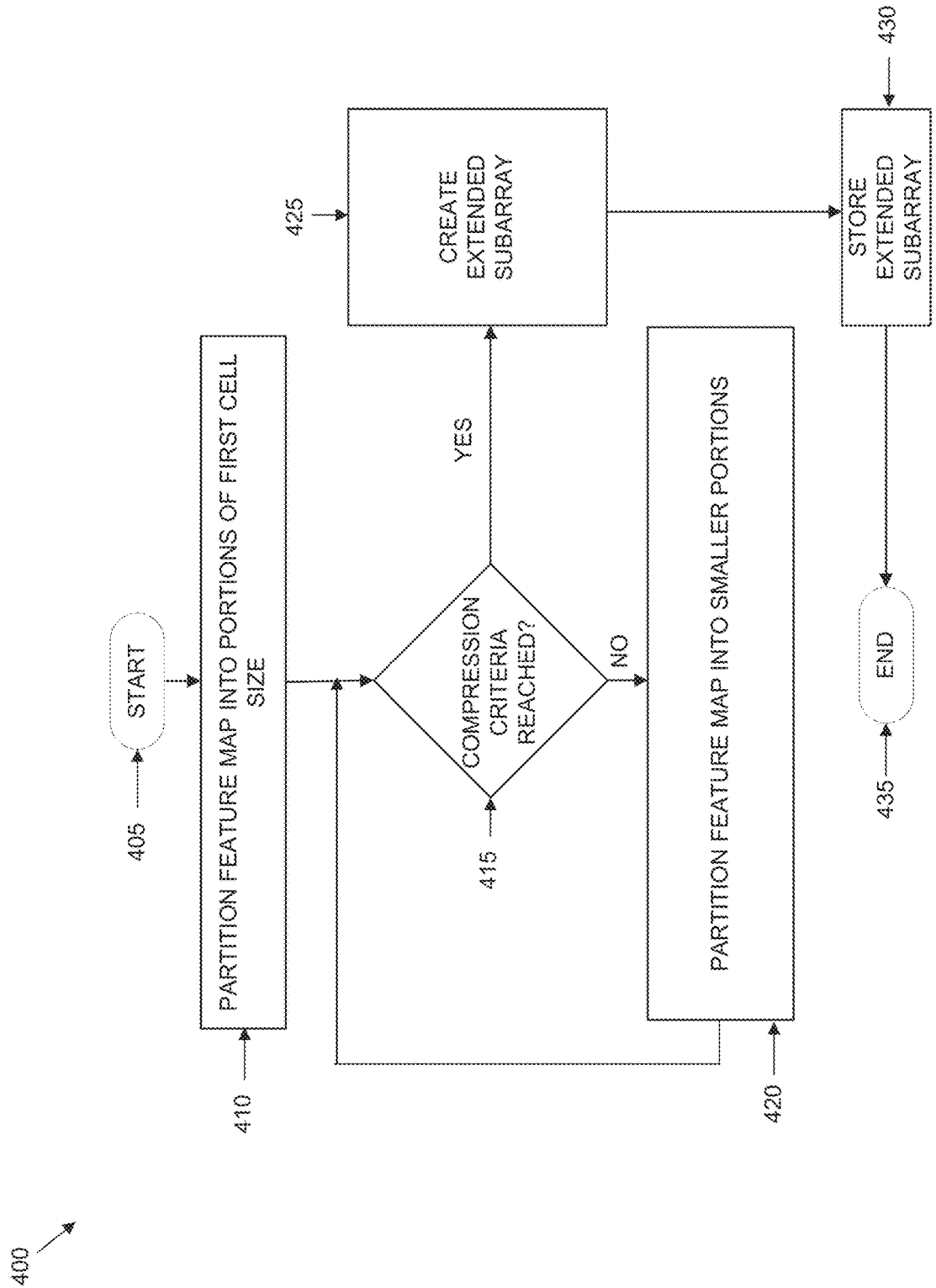
FIG. 4 is an example flowchart outlining operations for compressing the input feature map of FIGS. 3A-3D by the compression block, in accordance with some embodiments of the present disclosure.

Turning to FIG. 4, an example flowchart outlining operations of a process 400 for compressing a feature map is shown, in accordance with some embodiments of the present disclosure. The process 400 may include additional or other operations depending upon the particular embodiment. The process 400 may be implemented by the compression block 210 of the accelerator 200. The process 400 starts at operation 405 when a new feature map is input into the compression block 210. In some embodiments, the feature map being compressed may be generated from an input image (e.g., the input image 205). In other embodiments, the feature map being compressed may be from a previous layer of computation in the neural network. The feature map to be compressed may be stored within the DRAM 215 of the accelerator 200. Further, the compression block 210 may be programmed with a compression criteria to compress the feature map. The compression criteria may identify the number of compression levels, and the cell size in each compression level. In some embodiments, the compression criteria may also define a minimum threshold cell size. The process 400 stops when the compression criteria is met.

For example, in some embodiments, for a feature map that is 1024×1024×1 pixels in size, in some embodiments, four compression levels may be programmed within the compression block, with each subsequent compression level having an increasingly smaller cell-size. For example, in a first compression level, a cell size of 512×512 pixels may be used. In a second compression level, a cell size of 256×256 may be used, while in a third compression level, a cell size of 128×128 may be used. Similarly, in a fourth and final compression level, a cell size of 64×64 may be used. It is to be understood that the number of compression levels and the cell size in each compression may vary from one embodiment to another. Further, although in the examples above, the cell size in each next compression level is reduced by half, the cell size may reduce by other granularities in other embodiments. In some embodiments, the minimum threshold cell size may be defined and programmed within the compression block 210, such that the compression block may stop compressing when the minimum threshold cell size is reached. For example, in some embodiments, the compression block 210 may be programmed with the minimum threshold cell size and a granularity by which to reduce the cell size in each subsequent compression level. For example, in some embodiments, the compression block 210 may be programmed with a minimum threshold cell size of 64×64 pixels, and the granularity may be programmed as half, such that starting from the initial feature map size (e.g., 1024×1024), the compression block may automatically reduce the cell size in half in each subsequent compression level, until a cell size of 64×64 is reached.

Thus, in some embodiments, the compression block may be programmed with the number of compression levels and the cell size in each compression level. In other embodiments, the compression block may be programmed with the minimum threshold cell size, and the granularity with which to reduce the cell size in each next compression level. At operation 410, the compression block 210 partitions the feature map into portions, with each portion having the designated cell size for the first compression level. For example, for a 512×512 cell size, the compression block 210 may partition a 1024×1024 feature map into four portions, with each portion having a 512×512 cell size. For each portion, the compression block 210 may create a logical array (e.g., the logical array 310A) in which each cell of the logical array corresponds to one portion of the feature map. Each cell of the logical array may have a value of either zero or one. A zero value in the logical array indicates that all cells of the corresponding portion in the feature map have zero values, while a one value in the logical array indicates that at least one cell in the corresponding portion of the feature map has a non-zero value.

At operation 415, the compression block 210 determines if the compression criteria is reached. In some embodiments, where the compression criteria is the number of compression levels, the compression block 210 may determine if the last compression level has been reached at the operation 415. If the compression criteria (e.g., the last compression level) has not been reached at the operation 415, the compression block continues to compress the feature map at operation 420. In some embodiments, the compression criteria may be a minimum threshold cell size. In such cases, the compression block 210 may determine whether the minimum threshold cell size has reached at the operation 415. If the minimum threshold cell size has not reached, the compression block 210 continues to compress the feature map at the operation 420. In other embodiments, other compression criteria may be used.

To continue compressing the feature map at the operation 420, the compression block 210 partitions each of the portions obtained at the operation 410 into sub-portions, with each sub-portion having a smaller cell size compared to the cell size used at the operation 410. Thus, each portion is divided into multiple sub-portions. For each sub-portion, the compression block may create a logical array (e.g., the logical array 320). A cell of the logical array may have a value zero if the cells in the corresponding sub-portion in the feature map have all zero values, and a cell of the logical array may have a value one if at least one cell in the corresponding sub-portion in the feature map has a non-zero value.

Upon completion of the operation 420, the process 400 loops back to the operation 415 where the compression block 210 determines again if the compression criteria is met. The operations 415 and 420 are recursively repeated until the compression criteria is met. When the compression criteria is met, the compression block 210 creates an extended subarray at operation 425. Each cell of the extended subarray (e.g., the extended subarray 335) corresponds to one sub-portion of the feature map in the last compression level. Further, each cell of the extended subarray identifies, using an index value, which cells of the corresponding sub-portion have non-zero values and the value of the non-zero value.

The extended subarray represents the compressed version of the feature map, and is stored within the DRAM at operation 430. The extended subarray may be used to perform a sparsity analysis, as discussed in greater detail below. The process 400 ends at operation 435 waiting for the next feature map to be compressed. Although the process 400 has been described as compressing a feature map, in some embodiments, the process 400 may also be used for compressing a weight matrix. Further, in some embodiments, each color channel of the feature map may be compressed similarly. For example, if a feature map has three color channels (e.g., RGB color channels), each color channel may be compressed separately. In some embodiments, each compressed color channel of the feature map may be stored separately, while in some embodiments, the compressed color channels may be combined and stored together.

Figure 5:
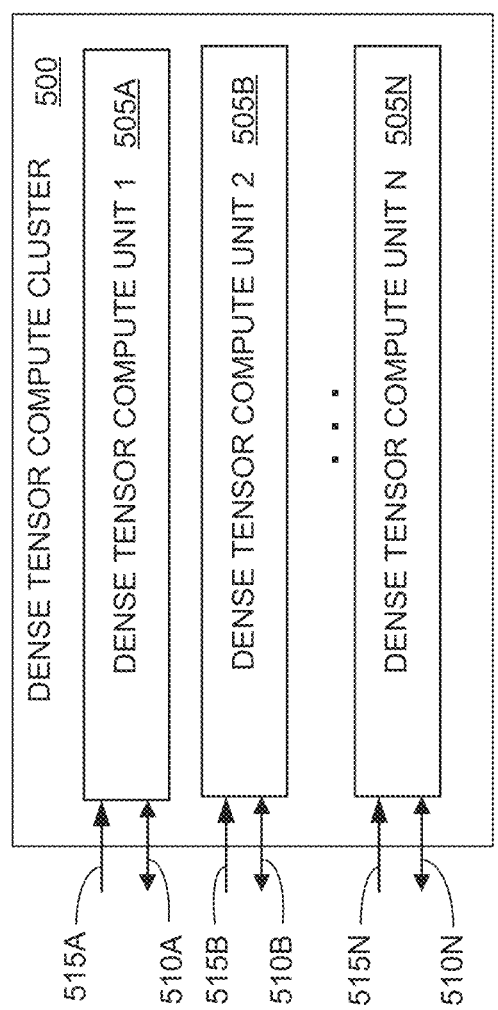
FIG. 5 is an example block diagram of a dense tensor compute cluster of the accelerator FIG. 2, in accordance with some embodiments of the present disclosure.

Referring to FIG. 5, an example dense tensor compute cluster 500 is shown, in accordance with some embodiments of the present disclosure. The dense tensor compute cluster 500 is analogous to the dense tensor compute cluster 240 of FIG. 2. The dense tensor compute cluster 500 includes a plurality of dense tensor compute units 505A-505N. The number of the plurality of dense tensor compute units 505A-505N may be dependent upon a designated number of input feature tensors that may be desired to be processed simultaneously in parallel. Each of the plurality of dense tensor compute units 505A-505N is independent from other dense tensor compute units, and processes data independent from other dense tensor compute units. Each of the plurality of dense tensor compute units 505A-505N receives an input tensor 510A-510N, respectively, as well as a respective weight 515A-515N. Each of the plurality of dense tensor compute units 505A-505N may be connected (either directly or indirectly through the scheduling engine 235) to the DRAM 215, the SRAM 220, and the flash memory 225 to receive the respective input tensors 510A-510N and the weights 515A-515N, and to send the results of the computation back.

Figure 6:
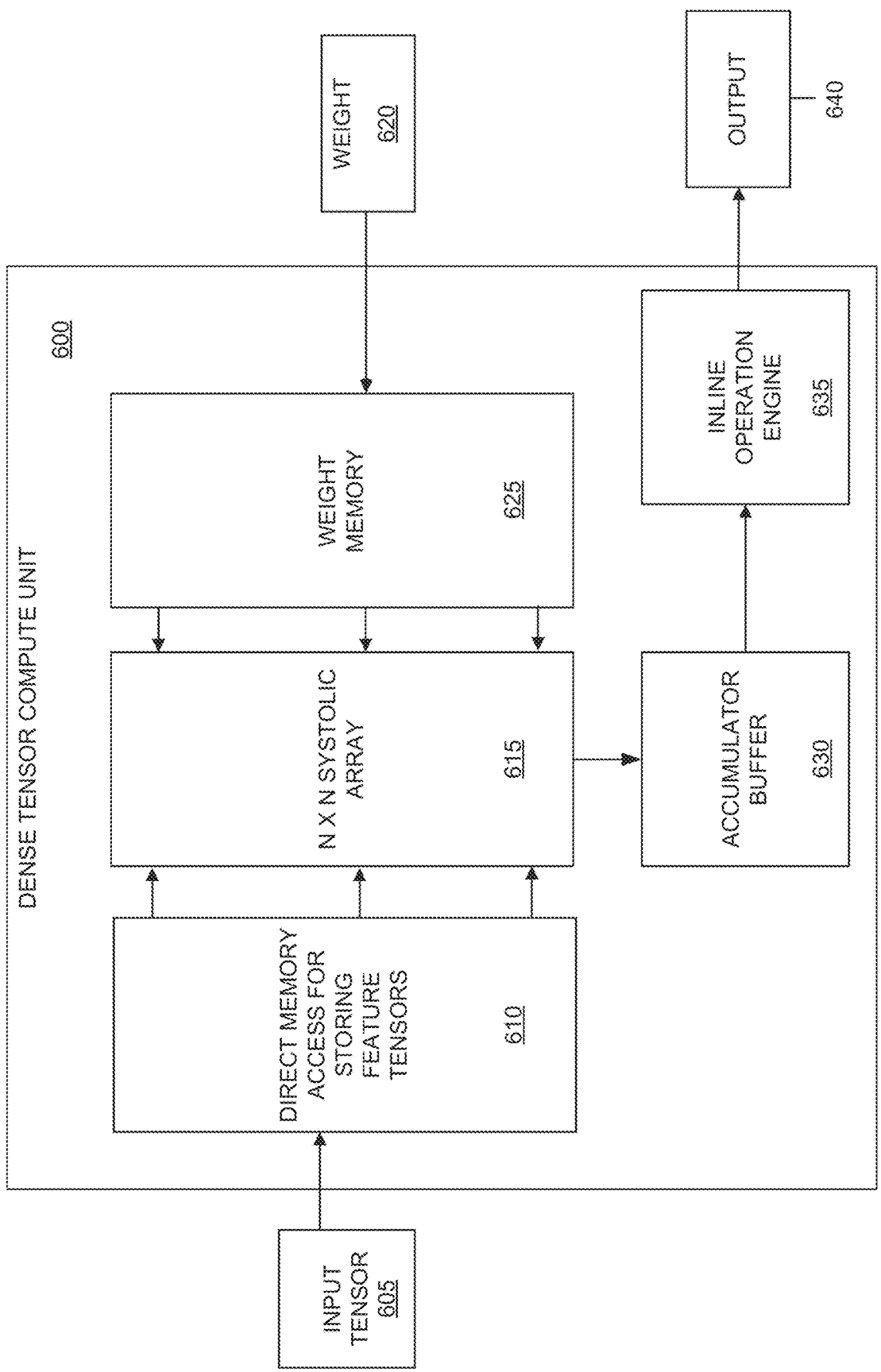
FIG. 6 is an example block diagram of a dense tensor compute unit of the dense tensor compute cluster of FIG. 5, in accordance with some embodiments of the present disclosure.

Turning to FIG. 6, an example dense tensor compute unit 600 is shown, in accordance with some embodiments of the present disclosure. The dense tensor compute unit 600 is analogous to one of the plurality of dense tensor compute units 505A-505N of FIG. 5. The dense tensor compute unit 600 is used to perform various machine learning operations such as multiplication, addition, etc., that may need to be performed for processing and combining the input tensor with the associated weight. Thus, the dense tensor compute unit 600 receives an input feature tensor 605 and temporarily stores the input feature tensor within a direct memory access controller 610. The input feature tensor 605 may be obtained by compressing a feature map, as discussed above, and particularly, may include the values in one cell of the extended subarray generated at the operation 425. The direct memory access controller 610 may be configured to transfer the input feature tensor 605 from the DRAM 215 or the SRAM 220 to a systolic array 615 with minimal intervention from a controller of the dense tensor compute unit 600. In some embodiments, a memory configured to store the input feature tensor 605 may be used instead of, or in addition to, the direct memory access controller 610.

The dense tensor compute unit 600 also receives a weight 620, which may be temporarily stored within a weight memory 625. In some embodiments, the weight memory 625 may be a direct memory access controller similar to the direct memory access controller 610. In some embodiments, the input feature tensor 605 and the weight 620 may be stored within the same memory associated with the dense tensor compute unit 600. The direct memory access controller 610 and the weight memory 625 may be sized appropriately to store at least one input feature tensor and associated weights, respectively. The systolic array 615 may be used to combine the input feature tensor 605 and the weight 620. Additional details of the systolic array 615 are discussed in FIG. 7 below. In other embodiments, other logic units may be used instead of the systolic array 615. The results of the systolic array 615 may be temporarily stored within an accumulator buffer 630. The accumulator buffer 630 may be a register that collects all of the intermediate results that are generated by the systolic array 615. When all of the results from the systolic array 615 are collected, the accumulator buffer 630 may provide those results to an inline operation engine 635.

The inline operation engine 635 may be configured to perform a non-linear Rectified Linear Unit (ReLU) operation and a pooling operation. Thus, the inline operation engine 635 may include N ReLU units, with each ReLU unit being configured to perform the ReLU operation on one of the N systolic array results. In some embodiments, a ReLU operation may implement the following activation function: $f(x)=\max(0,x)$. In other embodiments, the ReLU operation may implement other activation functions. The ReLU operation may generate one output for each input. Thus, for N inputs, the ReLU operation may generate N outputs. A pooling operation may then reduce the N results to M results. For example, a pooling operation having a kernel size of 2×2 may reduce N inputs into N/4 inputs. Thus, depending upon the kernel size of the pooling operation, the inline operation engine 635 may reduce N inputs into M inputs. The inline operation engine 635 may also include M pooling units, with each pooling unit configured to perform a down sampling operation on one of the N results of the ReLU operation. The pooling operation may perform a max pooling operation in which a maximum value from a group of cell values is determined, an average pooling operation in which an average of a group of cell values is determined, or a sum pooling operation in which a sum of a group of cell values is determined. In other embodiments, other pooling operations may be performed. The results of the pooling operation are sent back to the DRAM 215 or the SRAM 220 as output 640.

Referring now to FIG. 7, an example of a systolic array 700 is shown, in accordance with some embodiments of the present disclosure. The systolic array 700 is analogous to the systolic array 615. The systolic array 700 includes a plurality of data processing units 705A-705I called cells or nodes. In some embodiments, each of the plurality of data processing units 705A-705I is configured to perform multiplication and addition. Thus, although not shown, each of the plurality of data processing units 705A-705I may include an arithmetic logic unit to perform a bit-wise addition, as well as a bit-wise multiplication (e.g., using shifting). In other embodiments, each of the plurality of data processing units 705A-705I may include other or additional logic units to perform the addition and multiplication operations. The number of the plurality of data processing units 705A-705I may be dependent upon the size of the input feature tensor (e.g., the input feature tensor 605) and the size of the weight matrix (e.g., the weight 620). For example, for a 3×3 input feature tensor and a 3×3 weight matrix, nine data processing units may be needed in the systolic array 700. Thus, although nine data processing units (e.g., the plurality of data processing units 705A-705I) are shown in the systolic array 700, the number of those data processing units may vary in other embodiments depending upon the size of the input feature tensor and the weight matrix.

FIGS. 8A-8H show an example of how a matrix multiplication between an input feature tensor and a weight matrix may be performed in a systolic array 800. The systolic array 800 is analogous to the systolic array 700. Thus, the systolic array 800 includes data processing units 805A-805I. Simply as an example and without intending to be limiting in any way, FIGS. 8A-8H show a matrix multiplication between the following input feature tensor, A, and weight matrix, B:

$$A = \begin{bmatrix} a0,0 & a0,1 & a0,2 \\ a1,0 & a1,1 & a1,2 \\ a2,0 & a2,1 & a2,2 \end{bmatrix}$$

-continued $$B = \begin{bmatrix} b0,0 & b0,1 & b0,2 \\ b1,0 & b1,1 & b1,2 \\ b2,0 & b2,1 & b2,2 \end{bmatrix}$$

As shown in FIG. 8A, a row of A is fed into a row of the systolic array 800 one value at a time from the left hand side (e.g., from the data processing unit 805A) to the right hand side (e.g., to the data processing unit 805C). Similarly, a column of B is fed into a column of the systolic array 800 from the top (e.g., from the data processing unit 805A) to the bottom (e.g., to the data processing unit 805G). Further, the entry of each row and each column into the systolic array 800 may be staggered by one clock cycle. For example, at time, T=1, the first value of the first row of the input feature tensor and the first value of the first column of the weight matrix may be input into the systolic array 800. In the next clock cycle, at time, T=2, the second value of the first row of the input feature tensor and the second value of the first column of the weight matrix may be input into the systolic array 800. In the same clock cycle, at time, T=2, the first value of the second row of the input feature tensor and the first value of the second column of the weight matrix may be input into the systolic array 800, and so on, until all of the values of the input feature tensor and the weight matrix are fed into the systolic array.

Figure 8B:
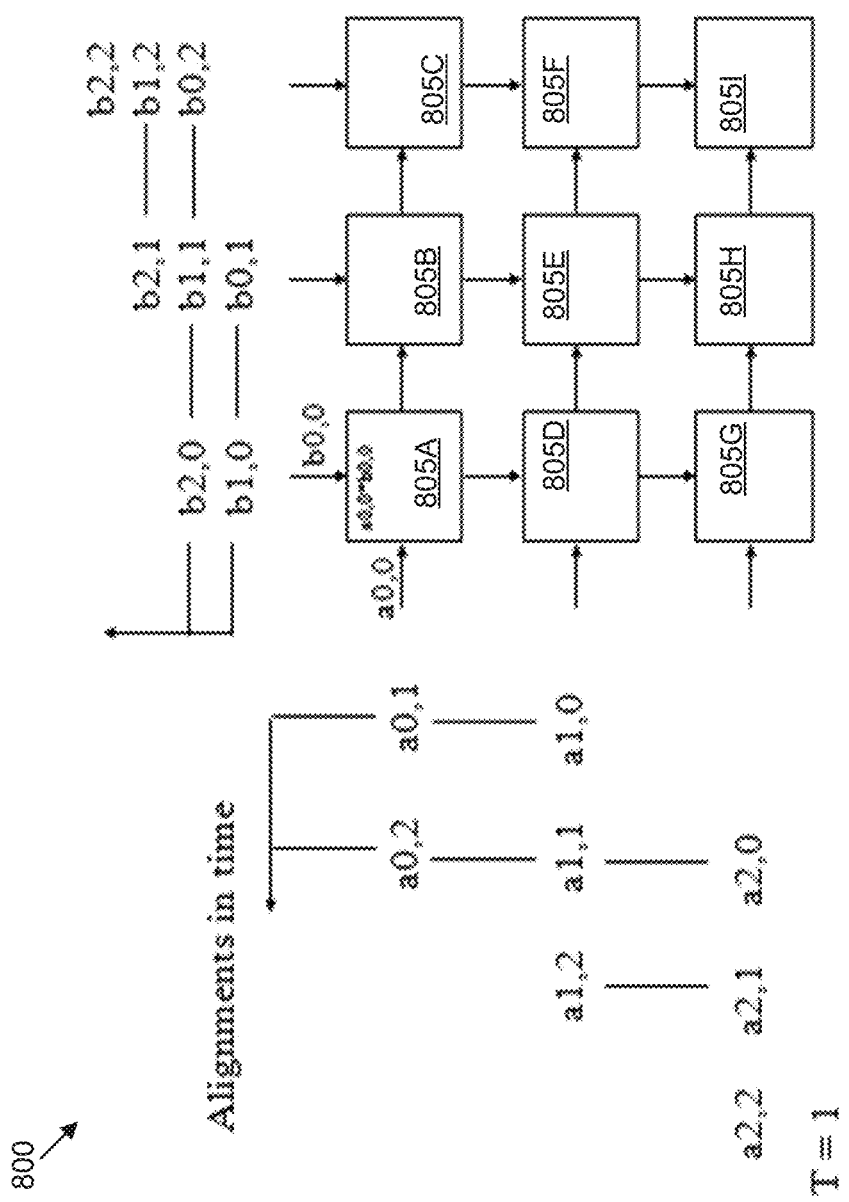

Thus, as shown in FIG. 8B, a0,0 and b0, 0 are input into the data processing unit 805A and a multiplication between those values is performed in that data processing unit. In some embodiments, each of the data processing units 805A-805I upon completing the computation therein may either temporarily store the results therein (e.g., in a memory associated therewith), send the results to the accumulator buffer (e.g., the accumulator buffer 630), and/or pass the results to the next data processing unit, which may then pass that result to the next data processing unit, and so on until the last data processing unit is reached. For example, in some embodiments, the data processing unit 805A may transfer the computation result to the data processing unit 805B, which may then pass the result (e.g., in the next clock cycle) to the data processing unit 805C, from which the result may pass to an accumulator buffer (e.g., the accumulator buffer 630) for temporary storage. In some embodiments, the data processing unit 805A may pass the results down through the column such as to the data processing unit 805D, then to the data processing unit 805G, and from the data processing unit 805G, the result may pass to the accumulator buffer.

Figure 8C:
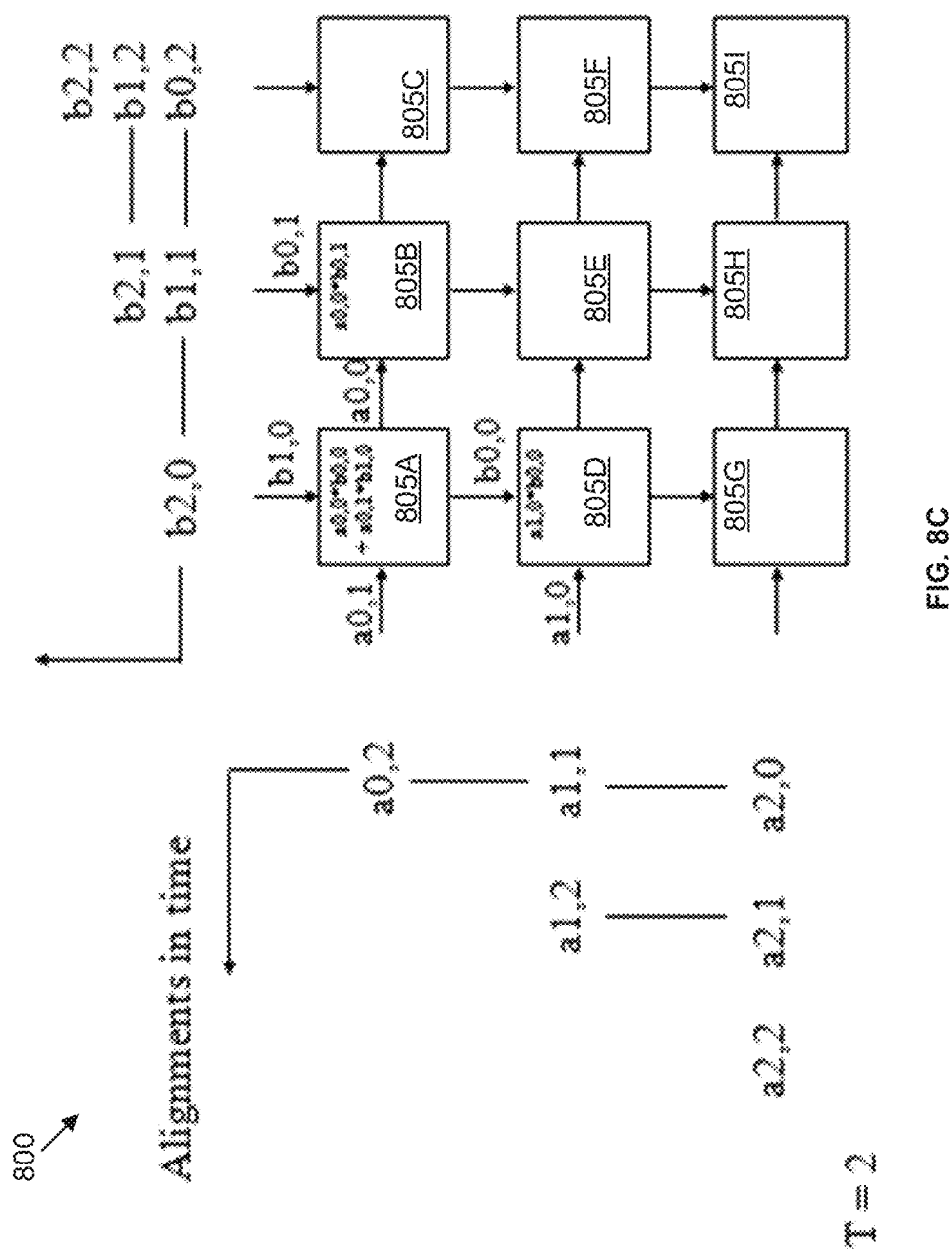
Figure 8D:
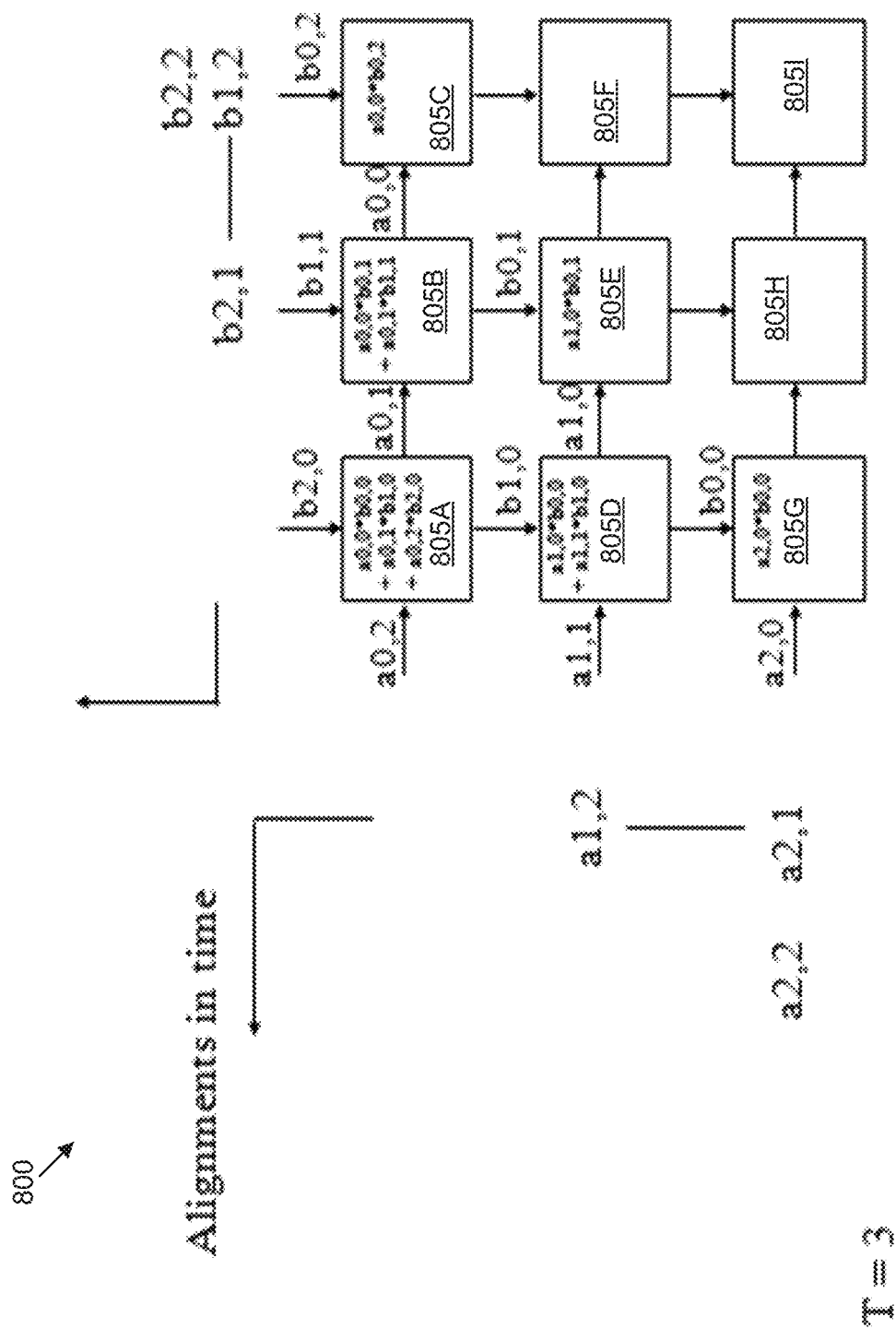
Figure 8E:
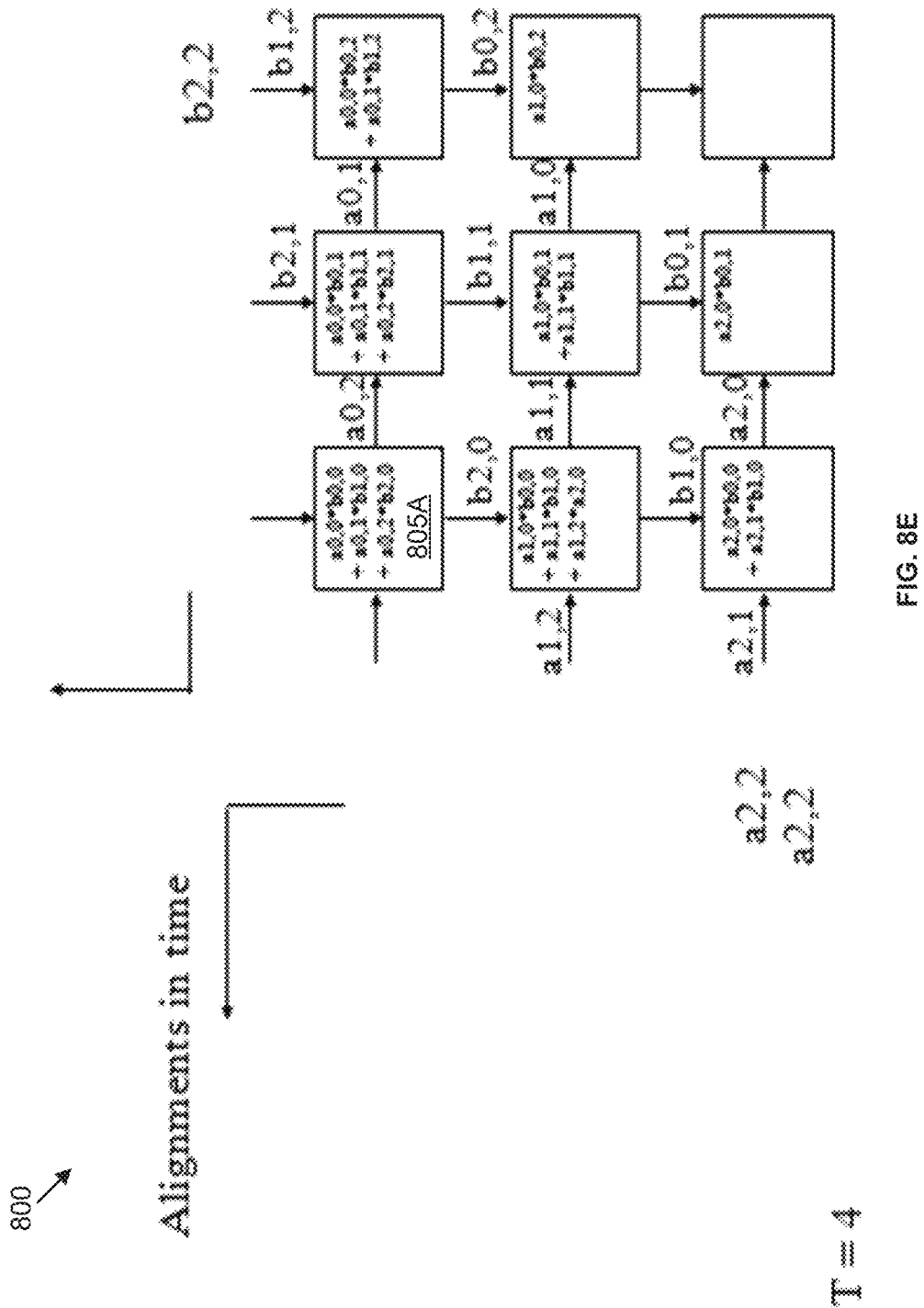
Figure 8F:
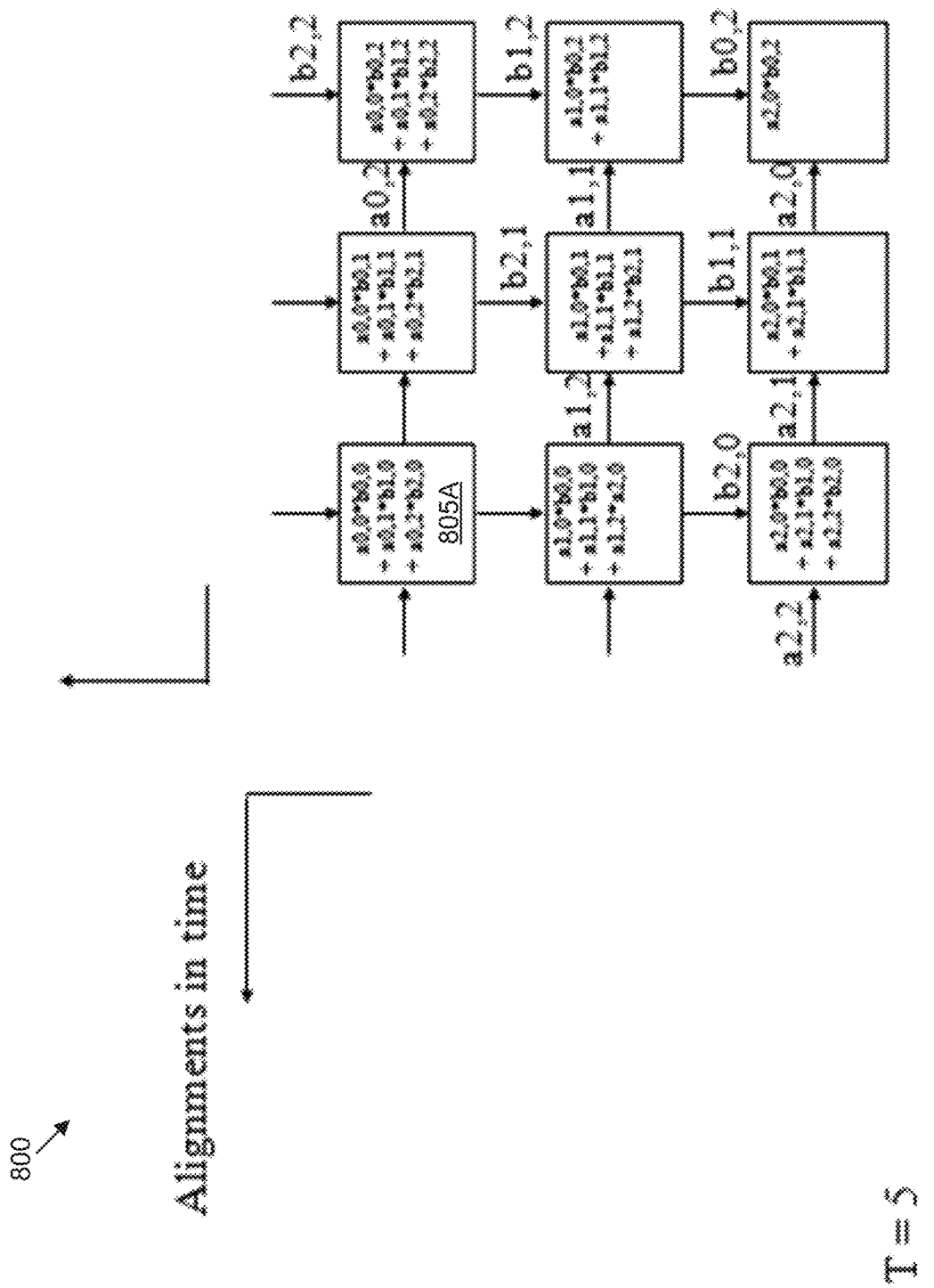
Figure 8G:
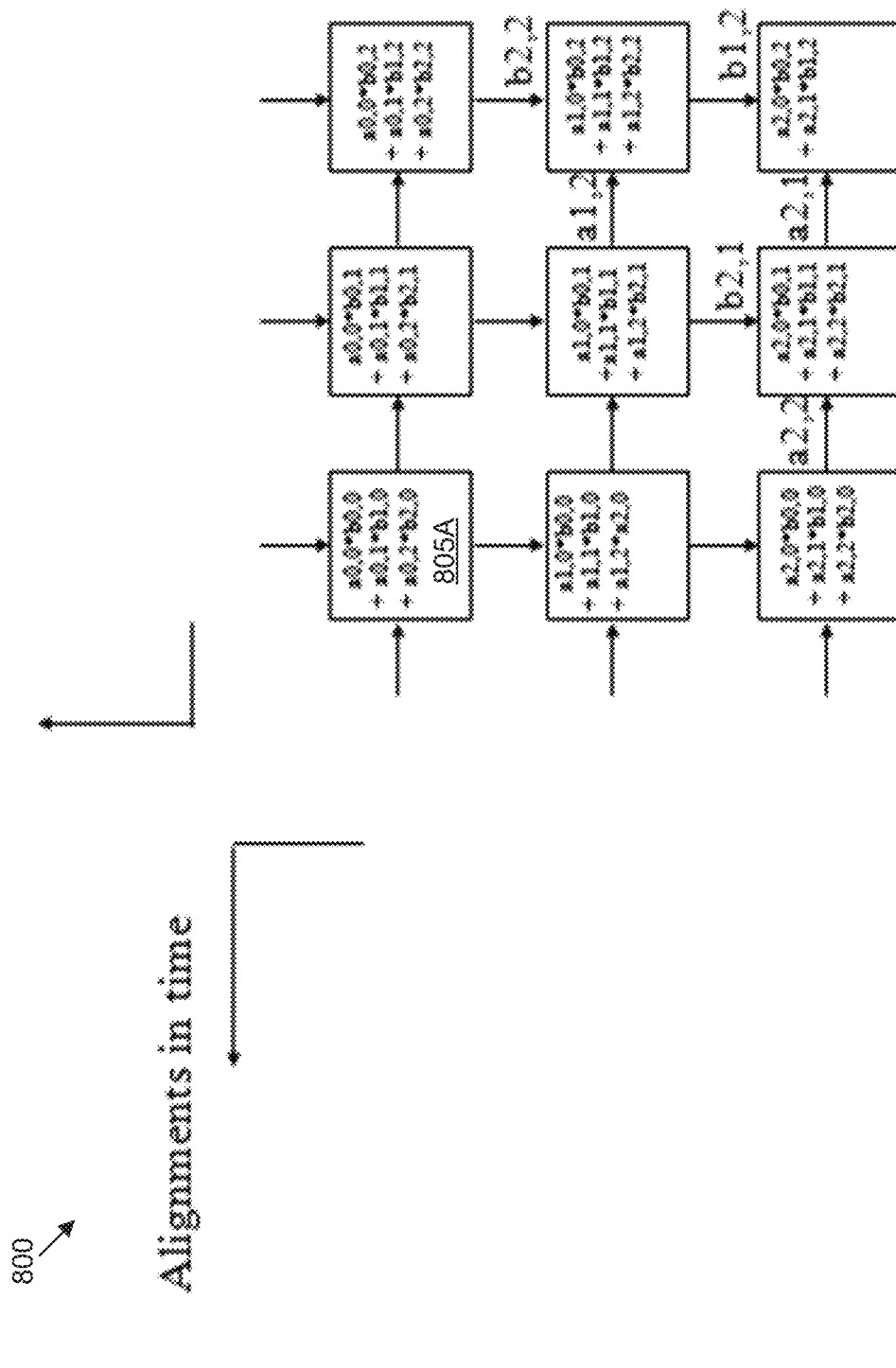

In the next clock cycle, as shown in FIG. 8C, the a0,0 value from the data processing unit 805A may be transferred to the data processing unit 805B and the b0,0 value from the data processing unit 805A may be transferred to the data processing unit 805D. Further, in the same clock cycle, value a0,1 of the input feature tensor and value b1,0 of the weight matrix may be input into the data processing unit 805A, while value a1,0 of the input feature matrix may be input into the data processing unit 805D and value b0,1 of the weight matrix may be input into the data processing unit 805B. Upon receiving their respective inputs, the data processing unit 805A performs a multiplication operation between a0,1 and b1,0, and adds the result of the multiplication to the multiplication result obtained in the data processing unit 805A in FIG. 8B (e.g., when the data processing unit 805A stores the result of FIG. 8A therein). Likewise, the data processing unit 805B may perform a multiplication between a0,0 and b0,1, while the data processing unit 805D may perform a multiplication between a1,0 and b0,0.

Figure 8H:
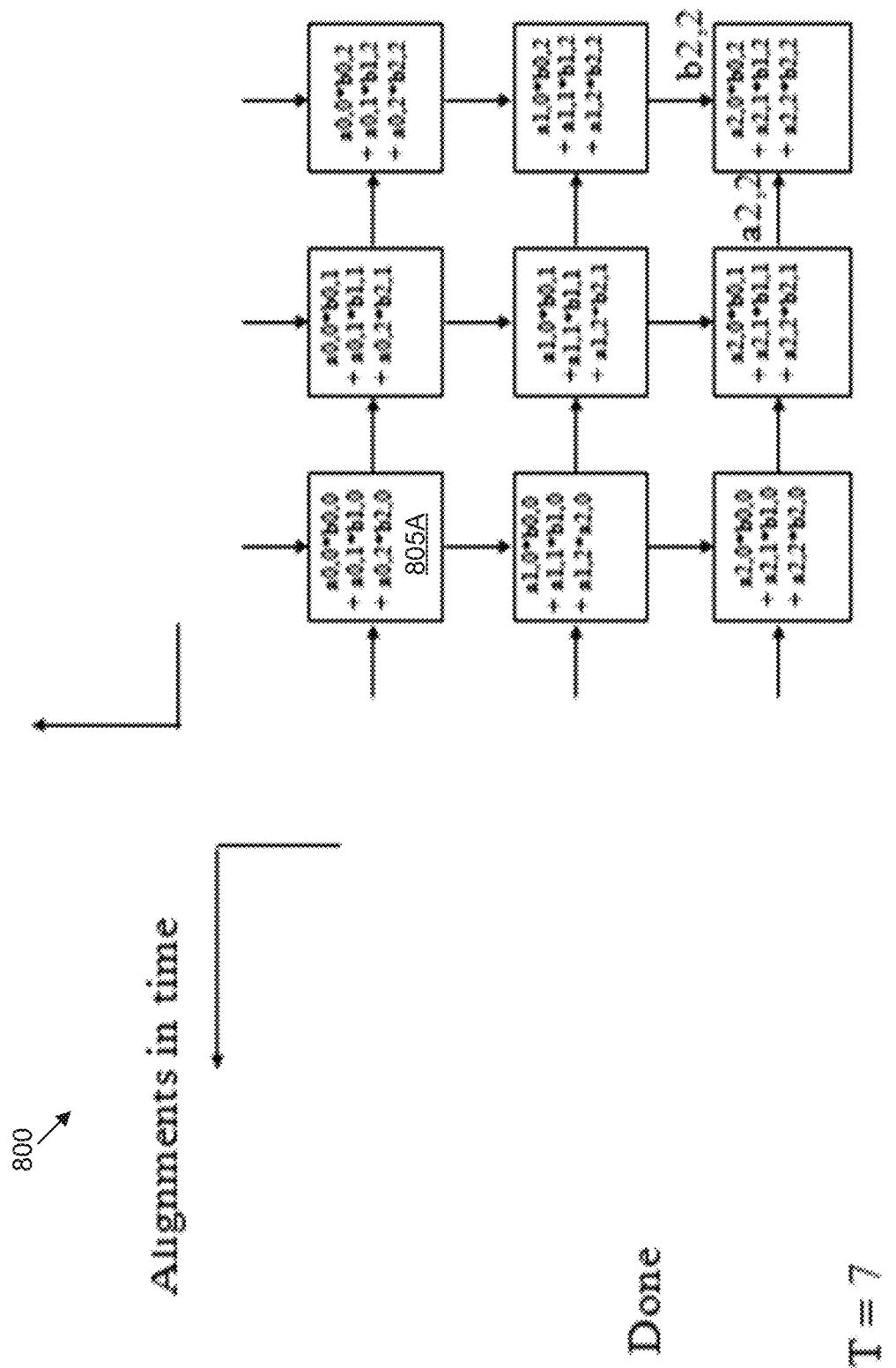

Similarly, in each clock cycle, the next values of A and B are input into the systolic array 800, as shown in FIGS. 8D-8H. Further, values already within the systolic array 800 from the previous clock cycles are shifted down by one row or one column, as shown in FIGS. 8D-8H. Upon receiving their respective input values, the data processing units 805A-805I perform multiplication and/or addition operations until all of the values of A and B have been input into the systolic array 800 and processed as discussed above. FIG. 8H shows that each of the data processing units 805A-805I contains one value of the result of matrix multiplication between A and B. The results may be stored within the accumulator buffer (e.g., the accumulator buffer 630) and passed on to the inline operation engine 635 for ReLU and pooling operations.

Figure 9:
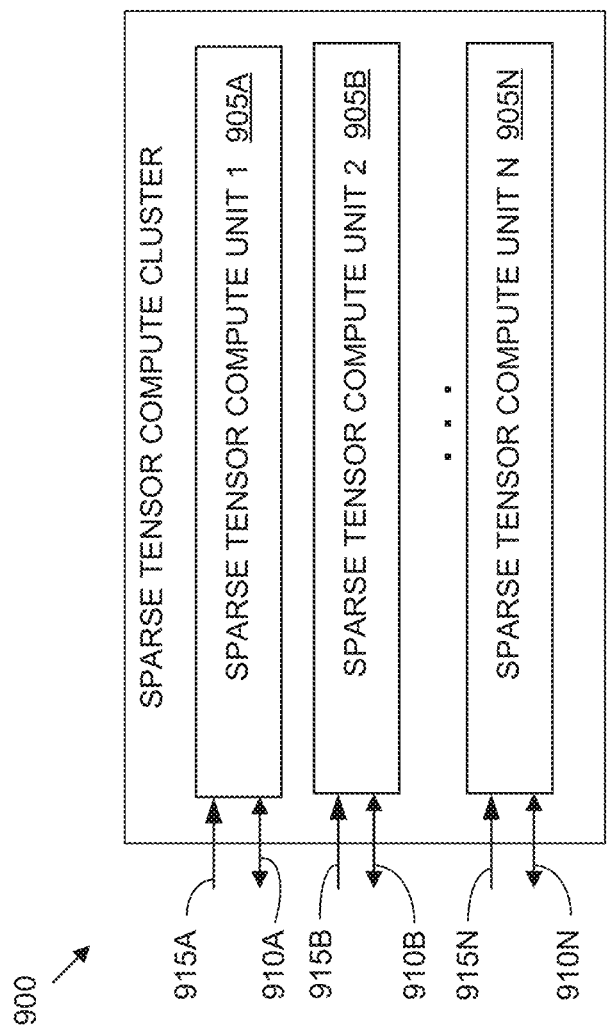
FIG. 9 is an example block diagram of a sparse tensor compute cluster of the accelerator of FIG. 2, in accordance with some embodiments of the present disclosure.

Turning to FIG. 9, an example sparse tensor compute cluster 900 is shown, in accordance with some embodiments of the present disclosure. The sparse tensor compute cluster 900 is analogous to the sparse tensor compute cluster 245 of FIG. 2. The sparse tensor compute cluster 900 includes a plurality of sparse tensor compute units 905A-905N. The number of the plurality of sparse tensor compute units 905A-905N may be same as or different from the number of the plurality of dense tensor compute units 505A-505N. The number of the plurality of sparse tensor compute units 905A-905N may be dependent upon a designated number of input feature tensors that may be desired to be processed simultaneously in parallel. Each of the plurality of sparse tensor compute units 905A-905N is independent from other sparse tensor compute units, and processes data independent from other sparse tensor compute units. Each of the plurality of sparse tensor compute units 905A-905N receives an input feature tensor 910A-910N, respectively, as well as a respective weight 915A-915N.

Thus, the plurality of sparse tensor compute units 905A-905N may be connected to the DRAM 215, the SRAM 220, and the flash memory 225 to receive the input feature tensors 910A-910N, to receive the weights 915A-915N, and to send the results of the computation back to the DRAM or SRAM.

Figure 10:
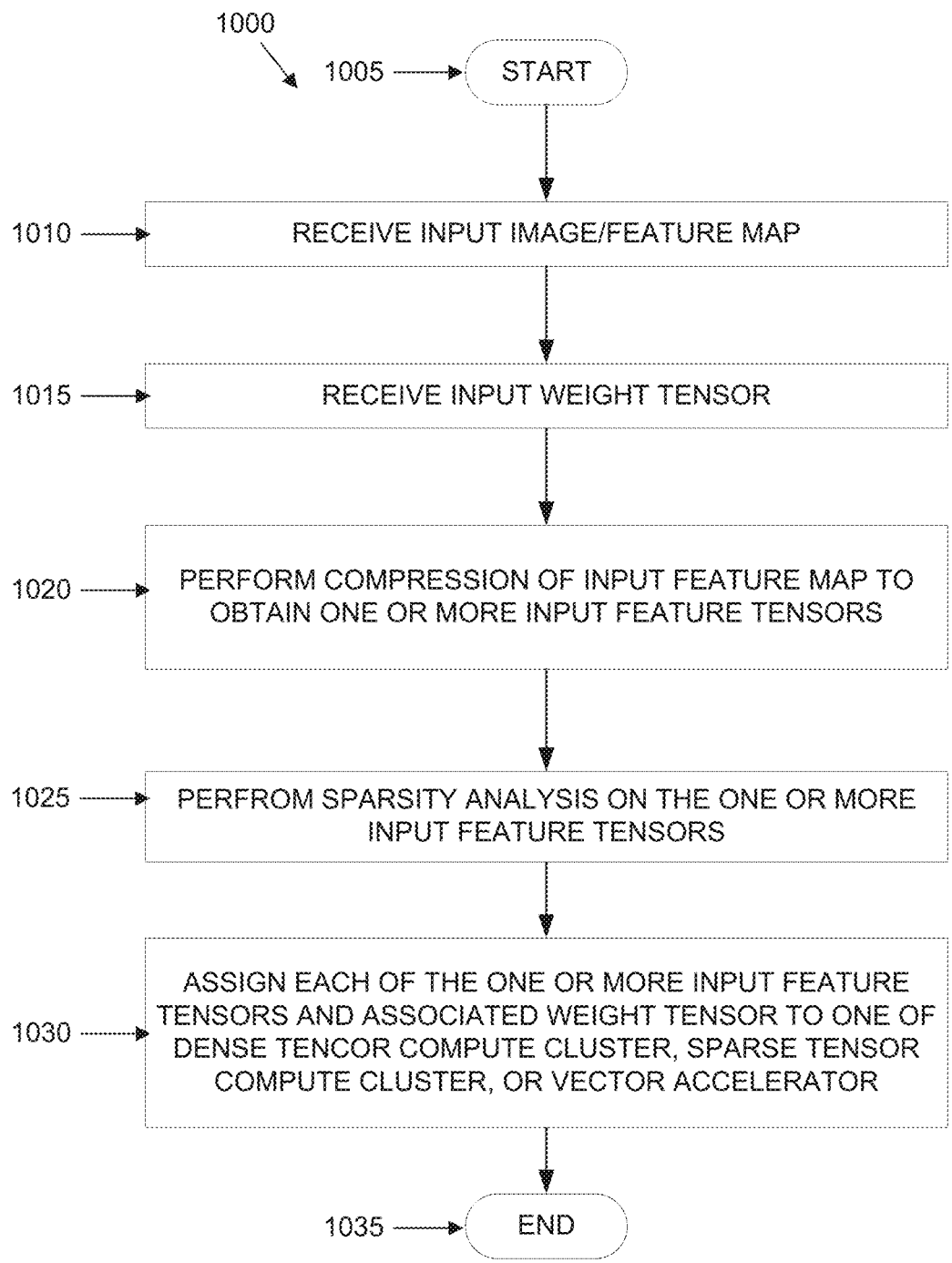
FIG. 10 is an example flowchart outlining operations performed by the accelerator of FIG. 2 for assigning an input feature tensor to one of the dense tensor compute cluster, the sparse tensor compute cluster, or the vector accelerator, in accordance with some embodiments of the present disclosure.

Turning now to FIG. 10, an example flowchart outlining operations of a process 1000 is shown, in accordance with some embodiments of the present disclosure. The process 1000 may include additional or other operations depending upon the particular embodiment. The process 1000 may be implemented by the accelerator 200. The process 1000 starts at operation 1005 when one or more machine learning operations are to be performed on a new input data (e.g., the input image 205). For example, when an image classification is to be done to identify one or more features in the input image, the process 1000 may be implemented. Thus, at operation 1010, the input image or the feature maps associated with the input image may be input into the accelerator 200.

The input image may be represented by an array of pixels based upon the size, height, and color scheme of the input image. Simply as an example and without intending to be limiting in any way, the process 1000 is explained below with respect to an input image of size 1024×1024×3. Thus, the input image is 1024 pixel wide and 1024 pixel high, and has 3 color channels. The input image may, thus, be treated as a combination of three feature maps, with one feature map for each color channel and each feature map having a size of 1024×1024×1. In some embodiments, the input image may be input into the accelerator 200, and the accelerator may derive the feature maps from the input image. In other embodiments, the conversion of the input image into the feature maps may occur outside the accelerator 200 (by another component on the host device (e.g., the host device 105) with which the accelerator 200 is associated), and the feature maps may be input into the accelerator instead of the input image. Further, the input image or the feature maps of the input image (whichever is input into the accelerator 200) may be stored within the DRAM 215 of the accelerator.

At operation 1015, the accelerator 200 receives a weight matrix (e.g., the weight matrix 230). Although the operation 1015 has been described as occurring after the operation 1010 in which the input image or the feature maps of the input image are received by the accelerator 200, in some embodiments, the operation 1015 may occur before the operation 1010. In some embodiments, the operations 1010 and 1015 may occur simultaneously or substantially simultaneously.

In some embodiments, the accelerator 200 may be configured for a neural network having a plurality of layers. For example, in some embodiments, the accelerator 200 may be configured for a convolutional neural network having a plurality of convolution layers. In some embodiments, each of the plurality of convolution layers may have a specific weight matrix that may be applied to the feature map of that layer. Thus, in such embodiments, the accelerator 200 may receive multiple weight matrices, with one weight matrix configured for one layer. Each weight matrix may include weights that may be applied to the feature maps. Specifically, a matrix multiplication may be performed between a corresponding weight matrix and the feature map. In some embodiments, the weight matrix may also be compressed. In some embodiments, the compression of the weight matrix may be performed by the accelerator 200. In such embodiments, the accelerator 200 may receive all of the weight matrices, which may at least temporarily be stored within the DRAM 215, and the compression block 210 may compress the weight matrices similar to the feature maps. In other embodiments, the accelerator 200 may apply a different compression scheme to the weight matrices than applied to the feature maps. In other embodiments, the compression of the weight matrices may occur outside of the accelerator 200. For example, in some embodiments, the host device (e.g., the host device 105) on which the accelerator 200 is located or another device other than the host device may implement a compression block to compress the weight matrices. In some embodiments, such a compression block (whether on the host device or on another device) may include an open source compiler such as Glow, Tensor Virtual Machine (TVM) compiler, or any other machine learning compiler.

In some embodiments, the weight matrices, before or after compression, may also be reordered, and a static sparsity analysis performed on the weight matrices. The static sparsity analysis may be performed before or after the compression of the weight matrices. In some embodiments, the static sparsity analysis may be performed by the accelerator 200, while in other embodiments, the static sparsity analysis may be performed outside the accelerator. The static sparsity analysis identifies the weight values in a weight matrix that are zero. If a particular weight value is zero, the matrix multiplication with that zero weight value is also zero. Thus, instead of allocating resources to multiply zero weight values with values in the feature maps, the results of those multiplication operations may directly be encoded as zero. Further, since the weight values that are zero in the weight matrix are known beforehand and do not change from one feature map to another, the sparsity in a weight matrix is static.

Thus, the weight matrices may be compressed and reordered, and a static sparsity analysis may be performed to identify zero weight values and obtain an input weight tensor from each weight matrix. Each of the input weight tensors may be stored within the DRAM 215, the SRAM 220, or the flash memory of the accelerator 200, and assigned for computation with a feature map based on a load and store schedule stored within the flash memory.

At operation 1020, the feature maps of the input image are compressed in the compression block 210, as discussed above. Although the operation 1020 is described after the operation 1015, in some embodiments, the operation 1020 may occur any time after the feature maps of the input image are available. The compression block 210 compresses each of the feature maps by recursively partitioning each of the feature maps into portions of smaller cell sizes, until a desired compression criteria is reached. The desired compression criteria may be based on the number of compression levels or the threshold minimum cell size, as discussed above. Upon reaching the desired compression criteria, the compression block 210 creates an extended subarray for each of the feature maps. Each cell of the extended subarray of each feature map may be considered an input feature tensor. Thus, from one feature map, multiple input feature tensors may be created. Each input feature tensor may either have zero values or non-zero values. Any input feature tensors of the extended subarray that have all zero values need not be stored in memory or assigned to any compute engine (e.g., the dense tensor compute cluster 240, the sparse tensor compute cluster 245, or the vector accelerator 250) for computation, thereby reducing overall computation time. Any input feature tensors that have at least one non-zero value may be stored in memory, and assigned to one of the compute engines (e.g., the dense tensor compute cluster 240, the sparse tensor compute cluster 245, or the vector accelerator 250).

Thus, the compression of the feature map in the compression block 210 identifies the sparsity in the feature map, and reduces the overall size of the feature map based upon the sparsity. Further, each of the input feature tensors that are to be assigned to a compute engine may undergo a sparsity analysis at operation 1025. To perform the sparsity analysis, the accelerator 200 determines the number or percentage of non-zeroes in each of the input feature tensors, and compares the number or percentage against a predetermined threshold programmed within the accelerator 200 (e.g., within the scheduling engine 235). For example, any input feature tensor that has the number or percentage of zeroes that is greater than or equal to the predetermined threshold may be considered a sparse tensor. For example, if a predetermined threshold is 50%, a tensor is determined to be a sparse tensor when it has more zero values than non-zero values. Similarly, any input feature tensor that has the number or percentage of zeroes that is less than the predetermined threshold may be considered a dense tensor. Following this same 50% threshold example, a dense tensor has more non-zero values than zero values.

Accordingly, for each input feature tensor, the accelerator 200 determines whether that tensor is a sparse tensor or a dense tensor. At operation 1030, the accelerator 200 assigns each input feature tensor to either the dense tensor compute cluster 240, the sparse tensor compute cluster 245, or the vector accelerator 250. Specifically, in some embodiments, the accelerator 200 may assign a sparse tensor to the sparse tensor compute cluster 245, and particularly to a sparse tensor compute unit of the sparse tensor compute cluster, since the sparse tensor compute cluster is specifically configured for computations having greater sparsity (e.g., more zero values). A sparse tensor compute unit is specifically designed to efficiently process sparse tensors by computing partial products (e.g., multiplication products) and committing updates to more than one value in an output feature map. Depending upon the number of sparse tensor compute units in the sparse tensor compute cluster 245, multiple input feature tensors may be processed simultaneously within the sparse tensor compute cluster.

Similarly, in some embodiments, the accelerator 200 may assign a dense tensor to the dense tensor compute cluster 240, and particularly to a dense tensor compute unit of the dense tensor compute cluster, since the dense tensor compute cluster is specifically configured for computations having less sparsity (e.g., fewer zero values). A dense tensor compute unit is specifically designed to process dense tensors by computing one dot product at a time. Further, depending upon the number of dense tensor compute units in the dense tensor compute cluster 240, multiple input feature tensors may be processed simultaneously within the sparse tensor compute cluster.

In some embodiments, instead of simply assigning a dense tensor to the dense tensor compute cluster 240 and a sparse tensor to the sparse tensor compute cluster 245, the accelerator 200 may assign dense and sparse tensors to the dense tensor compute cluster, the sparse tensor compute cluster, or the vector accelerator 250 based upon an optimization parameter. In such embodiments, a sparse tensor may be assigned to the dense tensor compute cluster 240 instead of the sparse tensor compute cluster 245. Similarly, where the assignment is based upon the optimization parameter, a dense tensor may be assigned to the sparse tensor compute cluster 245 instead of the dense tensor compute cluster 240. Thus, the assignment of a sparse tensor and a dense tensor may be based upon the sparsity and/or the optimization parameter. In some embodiments, the accelerator 200 may assign a sparse tensor to the sparse tensor compute cluster 245 and assign a dense tensor to the dense tensor compute cluster 240 by default, and change the assignment if the optimization parameter indicates that the sparse tensor may be better suited for execution on the dense tensor compute cluster or the dense tensor may be better suited for execution on the sparse tensor compute cluster.

In some embodiments, the optimization parameter may be based upon an execution time or power consumption. In other embodiments, the optimization parameter may be based upon other parameters that may be desired to be optimized. Execution time may determine the amount of time or number of clock cycles that an input feature tensor would need to complete execution in the dense tensor compute cluster 240, the sparse tensor compute cluster 245, or the vector accelerator 250. The accelerator 200 may determine which compute engine (e.g., the dense tensor compute cluster 240, the sparse tensor compute cluster 245, or the vector accelerator 250) would need a minimum execution time or an execution time below a threshold to complete execution on an input feature tensor, and allocate that input feature tensor to the compute engine that needs the least amount of execution time (or execution time below a threshold).

In some embodiments, the accelerator 200 may determine the execution time for an input tensor by running trace simulations to execute samplings from machine learning graphs to determine estimated computing or execution times. In some embodiments, the accelerator 200 may run the trace simulations in applications such as MATLAB. In other embodiments, the accelerator 200 may use other simulation applications that are configured to provide a model of a machine learning accelerator (e.g., the accelerator 200) to run the trace simulations of the various machine learning loads (e.g., the input feature tensors).

In some embodiments, the accelerator 200 may determine execution time based upon results of previously executed input feature tensors. For example, the accelerator 200 may find a previously executed input feature tensor that is similar to the input feature tensor that is to be currently executed. In some embodiments, the accelerator 200 may determine that a previously executed input feature tensor is similar to the input feature tensor that is to be currently executed based upon the sparsity of those input feature tensors. For example, if a previously executed input feature tensor and the input feature tensor that is to be currently executed have the same sparsity (e.g., same number of zeroes) or the difference in the sparsity is within a predetermined threshold, the accelerator 200 may determine that the previously executed input feature tensor is similar to the input feature tensor that is to be currently executed. In other embodiments, the accelerator 200 may use hashes of a graph of the previously executed input feature tensor and the input feature tensor to be currently executed as a metric for determining the similarities between those input feature tensors. In other embodiments, the accelerator 200 may use other metrics to identify a previously executed input feature tensor that is similar to the input feature tensor that is to be currently executed.

Upon identifying a previously executed input feature tensor that is similar to the input feature tensor that is to be currently executed, in some embodiments, the accelerator 200 may allocate the input feature tensor that is to be currently executed to the same compute engine that executed the previously executed input feature tensor. Thus, if the previously executed input feature tensor was executed by the dense tensor compute cluster 240, the accelerator 200 may assign the input feature tensor to be currently executed to the dense tensor compute cluster. Similarly, if the previously executed input feature tensor was executed on the sparse tensor compute cluster 245 or the vector accelerator 250, the accelerator 200 may assign the input feature tensor to be currently executed to the sparse tensor compute cluster or the vector accelerator, respectively. Assigning the input feature tensor that is to be currently executed to the same compute engine as the previously executed input feature tensor may be particularly advantageous when the accelerator 200 finds a single similar previously executed input feature tensor or if all similar previously executed input feature tensors were executed by the same compute engine.

However, if the accelerator 200 identifies multiple similar previously executed input feature tensors that executed on different compute engines, the accelerator may determine which one of the previously executed input feature tensor had the smallest execution time or had an execution time below a predetermined threshold. The accelerator 200 may then assign the input feature tensor that is to be currently executed to the same compute engine (e.g., the dense tensor compute cluster 240, the sparse tensor compute cluster 245, or the vector accelerator 250) on which the previously executed input feature tensor having the smallest execution time or the execution time below the predetermined threshold was executed. If the accelerator 200 identifies multiple previously executed input feature tensors having the smallest execution time or the execution time below the predetermined threshold, the accelerator may use other designated criteria to break the tie. Thus, in some embodiments, the optimization parameter may be based on execution time and the accelerator 200 may assign an input feature tensor to the compute engine (e.g., the dense tensor compute cluster 240, the sparse tensor compute cluster 245, or the vector accelerator 250) having a smallest execution time or an execution time below a threshold, as determined from trace simulations or previously executed input feature tensors.

In some embodiments, the optimization parameter may be based upon power consumption. Similar to the execution time, the accelerator 200 may run trace simulations to determine which compute engine would consume the least amount of power or consume power below a predetermined threshold. The accelerator 200 may run the trace simulations in a similar manner as discussed above with respect to the execution time. In other embodiments, the accelerator 200 may identify the power consumption of previously executed input feature tensors. Again, the accelerator 200 may first identify one or more previously executed input feature tensors that are similar to the input feature tensor that is to be currently executed, as discussed above. Upon identifying one or more previously executed input feature tensors that are similar to the input feature tensor that is to be currently executed, the accelerator 200 may assign the input feature tensor to be currently executed to the same compute engine (e.g., the dense tensor compute cluster 240, the sparse tensor compute cluster 245, or the vector accelerator 250) having a smallest power consumption or a power consumption below a threshold.

Thus, at the operation 1030, the accelerator 200 assigns, in one embodiment, each of the input feature tensors to either the dense tensor compute cluster 240, the sparse tensor compute cluster 245, or the vector accelerator 250. The process 1000 ends at operation 1035 with the accelerator 200 waiting for the next set of input feature tensors to become available for execution. In some embodiments, the result feature tensors obtained from executing the input feature tensors within the dense tensor compute cluster 240, the sparse tensor compute cluster 245, or the vector accelerator 250 may be transferred back to the DRAM 215 or the SRAM 220. The compression block 210 may perform the compression process discussed above on the result feature tensors to obtain additional input feature tensors from each of the result feature tensors. The input feature tensors obtained from the result feature tensors may then be processed again in accordance with the process 1000. Thus, the results from one layer (e.g., one layer of the convolutional neural network) may be used as input to the next layer (e.g., of the convolutional neural network).

The various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A control processor can synthesize a model for an FPGA. For example, the control processor can synthesize a model for logical programmable gates to implement a tensor array and/or a pixel array. The control channel can synthesize a model to connect the tensor array and/or pixel array on an FPGA, a reconfigurable chip and/or die, and/or the like. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus comprising:
   a first tensor compute cluster configured to receive and perform first tensor multiplication on first input feature tensors, the first tensor compute cluster including a plurality of independently operating dense tensor compute units, each dense tensor compute unit including an N×N systolic array of data processing units each configured to perform bit-wise addition and bit-wise multiplication of elements of the first input feature tensors and a weight matrix;
   a second tensor compute cluster configured to receive and perform second tensor multiplication on second input feature tensors more sparse than the first input feature tensors, the second tensor compute cluster including a plurality of sparse tensor compute units;
   a vector accelerator; and circuitry configured to:
      partition an input feature map into a plurality of input feature tensors including tensors having all zero values and tensors having non-zero values, the tensors having non-zero values including the first input feature tensors and the second input feature tensors, the partitioning based on a compression criteria; and
      assign each of the plurality of input feature tensors having non-zero values to one of the first tensor compute cluster, the second tensor compute cluster, or the vector accelerator based upon a respective sparsity parameter of each of the plurality of input feature tensors including assigning and sending the first input feature tensors to the first tensor compute cluster thereby causing the first tensor multiplication, assigning and sending the second input feature tensors to the second tensor compute cluster thereby causing the second tensor multiplication and assigning one or more additional input feature tensors to the vector accelerator.

2. The apparatus of claim 1, wherein the circuitry is further configured to classify each of the plurality of input feature tensors as either a sparse tensor or a dense tensor such that the sparse tensor comprises a greater number or percentage of zeroes than the dense tensor.

3. The apparatus of claim 2, wherein the circuitry is further configured to assign the sparse tensor to the second tensor compute cluster and assign the dense tensor to the first tensor compute cluster.

4. The apparatus of claim 3, wherein the circuitry is further configured to assign the sparse tensor or the dense tensor to the vector accelerator that are not supported by the first tensor compute cluster or the second tensor compute cluster.

5. The apparatus of claim 1, wherein the circuitry is further configured to assign each of the plurality of input feature tensors based upon the respective sparsity parameter in combination with an optimization parameter that comprises an execution time or a power consumption.

6. The apparatus of claim 5, wherein the circuitry is further configured to:
   for each of the plurality of input feature tensors, determine the execution time for executing that one of the plurality of input feature tensors on the first tensor compute cluster or the second tensor compute cluster; and
   assign that one of the plurality of input feature tensors to the first tensor compute cluster or the second tensor compute cluster based upon the respective execution times.

7. The apparatus of claim 5, wherein the circuitry is further configured to:
   for each of the plurality of input feature tensors, determine the power consumption for executing that one of the plurality of input feature tensors on the first tensor compute cluster or the second tensor compute cluster; and assign that one of the plurality of input feature tensors to the first tensor compute cluster or the second tensor compute cluster based upon the respective power consumption.

8. The apparatus of claim 5, wherein the circuitry is further configured to:

for a first input feature tensor of the plurality of input feature tensors, determine the execution time for a similar input feature tensor that previously executed on the first tensor compute cluster and the second tensor compute cluster; and assign the first input feature tensor to the first tensor compute cluster or the second tensor compute cluster based upon the respective execution time for the similar input feature tensor.

9. The apparatus of claim 5, wherein the circuitry is further configured to:

for a first input feature tensor of the plurality of input feature tensors, determine the power consumption for a similar input feature tensor that previously executed on the first tensor compute cluster and the second tensor compute cluster; and assign the first input feature tensor to the first tensor compute cluster or the second tensor compute cluster based upon the respective power consumption for the similar input feature tensor.

10. The apparatus of claim 1, wherein the circuitry is further configured to:

for a first input feature tensor of the plurality of input feature tensors, identify a second input feature tensor that previously executed on the first tensor compute cluster or the second tensor compute cluster and that has a similar metric as the first input feature tensor; and assign the first input feature tensor to the first tensor compute cluster or the second tensor compute cluster based upon which tensor compute cluster executed the second input feature tensor.

11. The apparatus of claim 1, wherein the circuitry is further configured to not assign the input feature tensors having all zero values to any of the first tensor compute cluster, the second tensor compute cluster or the vector accelerator.

12. The apparatus of claim 1, wherein the circuitry is further configured to:

assign input feature tensors having more than a predetermined percentage of non-zero values to the first tensor compute cluster; and assign input feature tensors having less than the predetermined percentage of non-zero values and more than zero non-zero values to the second tensor compute cluster.

13. The apparatus of claim 1, wherein to partition the input feature map into the plurality of input feature tensors, the circuitry is further configured to:

divide the input feature map into a plurality of portions, each of the plurality of portions having a first cell size; and recursively divide each of the plurality of portions into a plurality of sub-portions until the compression criteria is met.

14. The apparatus of claim 13, wherein the compression criteria comprises a number of compression levels or a threshold minimum cell size of each of the plurality of sub-portions.

15. The apparatus of claim 13, wherein the circuitry is further configured to create an extended sub-array from the plurality of sub-portions upon meeting the compression criteria.

16. A method comprising:

partitioning, by an accelerator, an input feature map into a plurality of portions, each of the plurality of portions having a first cell size;

recursively partitioning, by the accelerator, each of the plurality of portions into a plurality of sub-portions until a compression criteria is reached, wherein each of the plurality of sub-portions of each of the plurality of portions have a second cell size when the compression criteria is met;

creating, by the accelerator, an extended subarray based upon the plurality of sub-portions upon meeting the compression criteria, wherein the extended subarray comprises a plurality of cells, and each of the plurality of cells corresponds to an input feature tensor;

determining sparsity of each of the input feature tensors;

identifying one or more first input feature tensors containing only zero values;

identifying one or more second input feature tensors each containing at least one non-zero value;

assigning, by the accelerator, at least some of the second input feature tensors to each of a dense tensor compute cluster that includes a plurality of independently operating dense tensor compute units, each dense tensor compute unit including an N×N systolic array of data processing units, a sparse tensor compute cluster that includes a plurality of independently operating sparse tensor compute units, and a vector accelerator based upon the sparsity of the respective second input feature tensor and an optimization parameter;

feeding rows of a second input feature tensor that is assigned to the dense tensor compute cluster into rows of the N×N systolic array of data processing units;

feeding columns of a weight matrix into columns of the N×N systolic array of data processing units; and multiplying, by each data processing unit of the N×N systolic array, a value of the second input feature tensor by a value of the weight matrix in a clock cycle.

17. The method of claim 16, wherein the at least some of the input feature tensors that are assigned to the dense tensor compute cluster, the sparse tensor compute cluster, or the vector accelerator have at least one non-zero value.

18. The method of claim 16, wherein the input feature tensors that have all zero values are not assigned to any of the dense tensor compute cluster, the sparse tensor compute cluster, or the vector accelerator.

19. A non-transitory computer-readable media having computer-readable instructions stored thereon that when executed by a processor associated with an accelerator cause the processor to:

partition an input feature map into a plurality of input feature tensors including input feature tensors having non-zero values and input feature tensors that do not have any non-zero values based upon a compression criteria;

assign one or more of the plurality of input feature tensors that include non-zero values to each of a dense tensor compute cluster that includes a plurality of independently operating dense tensor compute units, each dense tensor compute unit including an N×N systolic array of data processing units, a sparse tensor compute cluster that includes a plurality of independently operating sparse tensor compute units, and a vector accelerator based upon a respective sparsity parameter of each of the plurality of input feature tensors;

feed rows of a second input feature tensor that is assigned to the dense tensor compute cluster into rows of the N×N systolic array of data processing units;

feed columns of a weight matrix into columns of the N×N systolic array of data processing units; and multiply a plurality of values of the second input feature tensor by a plurality of values of the weight matrix in the data processing units of the N×N systolic array in a clock cycle.

20. An apparatus comprising:

a dense tensor compute cluster configured to perform first tensor multiplication on dense input feature tensors, the dense tensor compute cluster including a plurality of independently operating dense tensor compute units, each dense tensor compute unit including an N×N systolic array of data processing units each configured to perform bit-wise addition and bit-wise multiplication of elements of the first input feature tensors and a weight matrix;

a sparse tensor compute cluster configured to receive and perform second tensor multiplication on sparse input feature tensors more sparse than the dense input feature tensors, the sparse tensor compute cluster including a plurality of sparse tensor compute units;

a vector accelerator; means for partitioning an input feature map into a plurality of input feature tensors including tensors having all zero values and tensors having non-zero values based upon a compression criteria; and means for assigning and sending at least one of the plurality of input feature tensors having non-zero values to each of the dense tensor compute cluster thereby causing performance of the first tensor multiplication, the sparse tensor compute cluster thereby causing performance of the second tensor multiplication, or the vector accelerator based upon a respective sparsity parameter of each of the plurality of input feature tensors.

* * * * *